(12) United States Patent
Pittner et al.

(10) Patent No.: US 10,400,854 B2
(45) Date of Patent: Sep. 3, 2019

(54) TORSIONAL VIBRATION DAMPER

(71) Applicant: ZF FRIEDRICHSHAFEN AG, Friedrichshafen (DE)

(72) Inventors: Daniel Pittner, Gerbrunn (DE); Joerg Sudau, Niederwern (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 243 days.

(21) Appl. No.: 15/503,363

(22) PCT Filed: Jul. 6, 2015

(86) PCT No.: PCT/EP2015/065278
§ 371 (c)(1),
(2) Date: Feb. 10, 2017

(87) PCT Pub. No.: WO2016/023678
PCT Pub. Date: Feb. 18, 2016

(65) Prior Publication Data
US 2018/0216698 A1    Aug. 2, 2018

(30) Foreign Application Priority Data
Aug. 11, 2014   (DE) .................. 10 2014 215 864

(51) Int. Cl.
*F16F 15/14* (2006.01)
*F16D 3/12* (2006.01)
*F16F 15/123* (2006.01)

(52) U.S. Cl.
CPC ............ *F16F 15/14* (2013.01); *F16D 3/12* (2013.01); *F16F 15/12353* (2013.01);
(Continued)

(58) Field of Classification Search
CPC ............ F16F 15/14; F16F 15/12353; F16F 2230/0041; F16F 2224/0208; F16F 2226/041; F16D 3/12; Y10T 74/2128
(Continued)

(56) References Cited

U.S. PATENT DOCUMENTS 9,638,283 B2 * 5/2017 Wirachowski ........ F16F 15/145
9,702,431 B2 * 7/2017 Kawazoe .......... F16F 15/13484
(Continued)

FOREIGN PATENT DOCUMENTS

DE   10 2011 086436   6/2012
DE   10 2012 212 704   1/2014
(Continued)

*Primary Examiner* — Greg Binda
(74) *Attorney, Agent, or Firm* — Cozen O'Connor

(57) ABSTRACT

A torsional vibration damper for damping a vibration component of a rotational movement around an axial direction has a damper mass to carry out an oscillation to damp the vibration component, a damper mass carrier to movably guide the damper mass, and a supporting body in contact with or can enter into contact with the damper mass in at least one operating situation of the torsional vibration damper. The supporting body is connected to the damper mass carrier to drive the supporting body relative to the damper mass carrier during rotation of the torsional vibration damper, and a support structure formed together with the supporting body to radially support the supporting body under a first operating condition and to radially release the supporting body under a second operating condition which differs from the first operating condition.

12 Claims, 18 Drawing Sheets

(52) U.S. Cl.
CPC . *F16F 2224/0208* (2013.01); *F16F 2226/041* (2013.01); *F16F 2230/0041* (2013.01); *Y10T 74/2128* (2015.01)

(58) Field of Classification Search
USPC ........................................................ 464/68.2
See application file for complete search history.

(56) References Cited

U.S. PATENT DOCUMENTS

| | | | |
|---|---|---|---|
| 2015/0247551 A1* | 9/2015 | Lorenz .............. | F16F 15/13128 464/68.2 |
| 2016/0215851 A1* | 7/2016 | Maienschein ......... | F16F 15/145 |
| 2018/0216697 A1* | 8/2018 | Pittner .................... | F16F 15/14 |

FOREIGN PATENT DOCUMENTS

| | | |
|---|---|---|
| DE | 10 2012 219738 | 4/2014 |
| DE | 10 2013 204 713 | 9/2014 |

\* cited by examiner

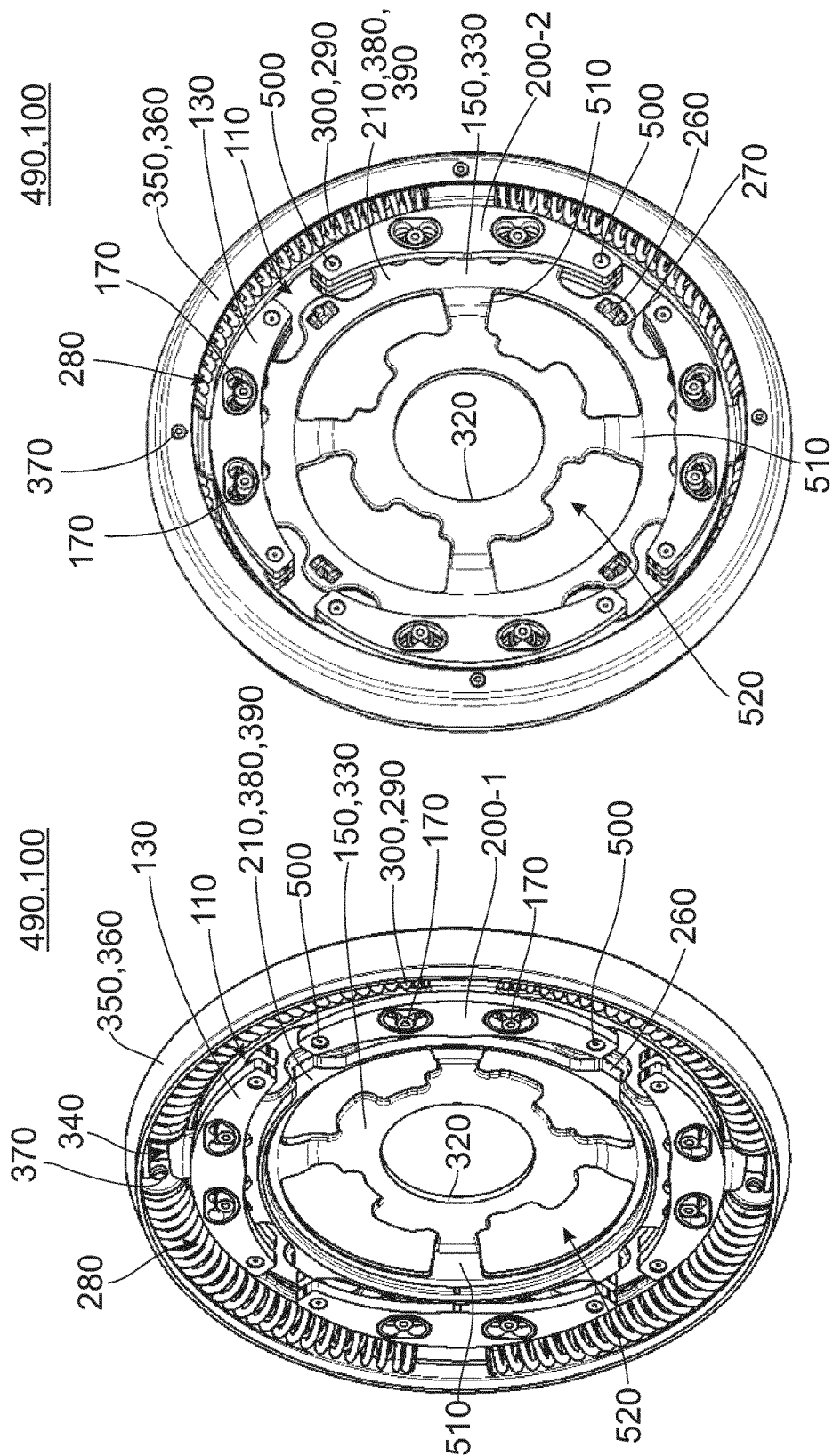

TORSIONAL VIBRATION DAMPER

CROSS REFERENCE TO RELATED APPLICATIONS

This is a U.S. national stage of application No. PCT/EP2015/065278, filed on Jul. 6, 2015. Priority is claimed on German Application No. DE102014215864.8, filed Aug. 11, 2014, the content of which is incorporated here by reference.

BACKGROUND OF THE INVENTION

1. Field of the Invention

Embodiment examples are directed to a tuned mass damper and a torsional vibration damper.

2. Description of the Prior Art

In many areas of mechanical engineering, plant engineering, and vehicle engineering, rotational movements are used to transmit mechanical energy. An example of this in vehicle engineering or motor vehicle engineering is rotational movement that is generated by the drive motor transmitted via a drivetrain to the driven wheels of a motor vehicle. In this connection, an internal combustion engine is often used as drive motor and, due to its mode of construction and operating principle, it generates a rotational movement that includes rotational irregularities, i.e., for example, vibration components.

However, it is precisely these rotational irregularities that may be undesirable with respect to driving comfort and also with respect to mechanical loading. For example, a passenger in a motor vehicle of this type may sense these rotational irregularities as vibration or noise, which is frequently found by the passenger to be annoying. But also with respect to the reliable operation of the motor vehicle and the life of the motor vehicle, rotational irregularities can lead correspondingly, for example, to mechanical stresses which can shorten the life of individual components.

Torsional vibration dampers are used to dampen or even eliminate rotational irregularities. These torsional vibration dampers temporarily buffer the energy stored in the rotational irregularities and return this energy to the rotational movement in a phase-shifted manner, which results in the required damping of the rotational irregularities.

An added, not insignificant challenge presenting itself in recent years has been the trend toward more energy-efficient, i.e., particularly fuel-efficient, motor vehicles in order to reduce fuel consumption. To this end, vehicle manufacturers have striven to reduce the overall weight of the vehicles, use engines with higher fuel efficiency and reduce friction losses from the drivetrain to name only a few technical measures.

Through the use of engines with higher fuel efficiency, it may come about, for example, that the rotational irregularities increase because vehicles with fewer cylinders or turbocharged engines are used, for example. Nevertheless, efforts persist to limit loss of comfort as much as possible and possibly even to satisfy the increasing demands of drivers and users of motor vehicles with regard to comfort.

Within the framework of torsional vibration dampers, use is made of tuned mass dampers, for example, in which the rotational movement does not run via the above-mentioned energy storage elements, but rather in which these energy storage elements, for example, in the form of moving masses, are merely coupled to the structural component part transmitting the rotational movement. These damper masses can carry out movements in order to absorb energy peaks of the rotational irregularities and, ideally, to couple them in-phase back into the rotational movement.

However, when starting and stopping the drive motor, a phase occurs in which the speed is so low that the dominating force acting on the damper masses is gravitational force and not centrifugal force. In this phase, the damper masses may possibly collide in their end stops, which may be unpleasant for the driver and other passengers as well as to those in the vicinity of a motor vehicle of this type because such noises can sound like knocking of metal, for example. This kind of metallic clanging is often perceived as unpleasant or as indicating a mechanical defect.

Due to the proliferation of automatic start-stop and other fuel-saving measures, stopping and starting of the drive motor occurs more frequently. But in other operating situations as well, these or similar noises can be produced by corresponding impacts.

For this reason, various steps have been taken to prevent such noises. To this end, for example, supporting rings are used that enter into contact with the damper masses and can accordingly reduce or even completely prevent the occurrence of corresponding noises which are perceived as unpleasant.

A supporting ring of this kind may be exposed to enormous forces and moments during operation. Nevertheless, a supporting ring of this kind may not fail itself, nor may it be responsible for a failure of a component of the drivetrain or for damage within the area of the drivetrain.

SUMMARY OF THE INVENTION

Therefore, there is a need to find a better compromise with respect to the operating reliability of a torsional vibration damper or tuned mass damper, the construction and production of the latter with the simplest possible means, a simple assembly, attainable comfort and an implementation that makes efficient use of installation space and saves weight.

However, this challenge emerges not only in the field of vehicle engineering and motor vehicle engineering, but can arise whenever rotational movements in which rotational irregularities occur are used to transmit mechanical energy. In this respect, depending on the specific application, an individual aspect may be less important, e.g., comfort in machine tools or construction machinery. But it may also be advisable with other installations and machinery to use a torsional vibration damper or a tuned mass damper to reduce or eliminate rotational irregularities.

Therefore, there is a need not only in the field of motor vehicle construction and generally in the field of vehicle engineering but also in other areas of plant engineering and mechanical engineering to facilitate the above-mentioned compromise.

A tuned mass damper for damping a vibration component of a rotational movement around an axial direction, for example, for a drivetrain of a motor vehicle, comprises a damper mass configured to carry out an oscillation depending on the rotational movement in order to damp the vibration component of the rotational movement. The tuned mass damper further comprises a damper mass carrier configured to movably guide the damper mass, and a supporting body configured to be in contact with or to enter into contact with the damper mass in at least one operating state of the tuned mass damper. The supporting body has a catch structure and the damper mass carrier has a catch aperture via which the supporting body is connected to the damper mass carrier by positive engagement in order to secure the supporting body relative to the damper mass carrier in axial direction. In this respect, the supporting body can optionally be axially secured in axial direction in both directions. For example, the supporting body can be secured in both axial directions solely through the positive engagement connection to the damper mass carrier.

An example of an operating state can include stoppage of the tuned mass damper but also, for example, an operating state with a vibration exceeding a predetermined vibration amplitude. Falling below a predetermined speed or another corresponding operating state may also occur, as a result of which the supporting body and damper mass enter into contact or are in contact.

It may also be possible through the use of a tuned mass damper to facilitate a compromise between operating reliability, simple assembly, simple construction and production, comfort, efficient use of installation space, and weight in that the supporting body is connected to the damper mass carrier by positive engagement. This can make it possible to reduce noise generation or other troublesome effects and, at the same time, to axially secure the supporting body such that it is prevented from falling out in axial direction. Beyond this, it can be possible through the use of a positive engagement connection to facilitate production of the supporting body and/or of the damper mass carrier. Additionally or alternatively, the assembly of the tuned mass damper can also be simplified. Accordingly the supporting body in the tuned mass damper can have the above-mentioned catch structure which is in turn configured to provide the positive engagement connection with the catch aperture of the damper mass carrier. The use of a catch structure of this kind can possibly further facilitate the fitting of the supporting body to the damper mass carrier. Using the corresponding catch structure, for example, by placing the supporting body on the damper mass carrier in a corresponding manner, the catch structure can be brought into engagement with the catch aperture in such a way that it produces the positive engagement connection. In this way, more complex joining techniques can be dispensed with during assembly.

In the tuned mass damper, the catch structure can optionally have a reach-through portion configured to extend through the catch aperture. The catch structure can further have a catch nose which is connected to the reach-through portion and is formed to engage behind the damper mass carrier along a back engagement direction. A construction of this type can allow the supporting body to be fitted to the damper mass carrier in a comparatively simple manner and can accordingly further facilitate the assembly of the tuned mass damper.

In a tuned mass damper, the catch structure can optionally be elastically deformable to make it possible to engage behind the damper mass carrier. This can make it possible to produce the positive engagement connection by simply placing or sliding the supporting body onto the damper mass carrier. A further simplifying assembly can possibly be achieved in this way.

Additionally or alternatively in a tuned mass damper, the catch nose can protrude beyond the reach-through portion along the back engagement direction, and the reach-through portion is elastically deformable along the back engagement direction to make it possible to engage behind the damper mass carrier. It can be possible in this way by comparatively simple constructional steps to provide an elastic deformability of the catch structure and, at the same time, to achieve in other areas of the supporting body a sufficient mechanical stability capable of preventing unintentional disengagement, for example, even under greater loads. It may also be possible to prevent a mechanical deformation of the supporting body in other areas.

Optionally, in a tuned mass damper of this type the reach-through portion can be made of an elastic material and can have a thickness such that the reach-through portion allows an elastic deformation along the back engagement direction which corresponds at least to a minimum extension of the back engagement along the back engagement direction of the catch structure in engaged condition. This can make it possible to provide identical or substantially identically constructed catch structures on sides which face one another so that tilting moments, for example, or other mechanical loads can likewise be absorbed. Operating reliability can be further increased in this way.

Additionally or alternatively in a tuned mass damper, the catch nose can have a bevel arranged at a side remote of the damper mass carrier in an engaged condition, this bevel being configured to bring about the elastic deformation of the reach-through portion by entering into contact with the damper mass carrier when the catch structure is inserted along the axial direction. This can make it possible to reduce expenditure of energy during assembly and accordingly to simplify assembly without impairing the axial securing function. The catch nose can optionally have a contact face at a side facing the damper mass carrier in the engaged state, this contact face having a surface normal which extends substantially parallel to the axial direction. Depending on the specific configuration, the surface normal of the contact face can form an angle with the axial direction of up to 20° or up to 10°, for example. Correspondingly, depending on the specific configuration, the bevel can have an angle of, for example, at least 10° or at least 20° relative to the axial direction. In some implementations, the catch structure can have, for example, a surface normal of the bevel amounting to at least 30° or at least 45°. To economize on axial installation space, it may be advisable to limit the angle between the bevel and the axial direction to a maximum of 80°, a maximum of 70° or a maximum of 60°.

Additionally or alternatively in a tuned mass damper, the catch nose can protrude radially outward over the reach-through portion, radially inward over the reach-through portion and/or along a circumferential direction over the reach-through portion. Accordingly, depending on the specific configuration, the position of the catch structure and catch nose thereof can possibly be simply adapted to the existing limitations with respect to installation space or to other parameters. This makes it possible to further enhance operating reliability of the tuned mass damper because the catch noses operate significantly for axially securing, but at least contribute to this axial securing.

Additionally or alternatively in the tuned mass damper, the catch structure can have a plurality of reach-through portions and a plurality of catch noses. The reach-through portions can be formed in this case to extend through one or more catch apertures, while the catch noses are connected in each instance to one of the reach-through portions and configured to engage behind the damper mass carrier. This makes it possible to further enhance operating reliability because every catch structure has a plurality of catch noses available for axially securing, for example, through simple constructional elements, so that it is less likely that, for example, manufacturing tolerances or movements of the supporting body taking place during operation will lead to a loosening of the axial securing.

In a tuned mass damper of this type, the supporting body can optionally have exactly one retaining portion and at least one fastening portion, and the retaining portion is directly connected to the at least one fastening portion. The retaining portion can be configured to be in contact with or enter into contact with the damper mass in at least one operating situation of the tuned mass damper, for example, the stoppage of the tuned mass damper, and the reach-through portions of the plurality of reach-through portions are connected in each instance to exactly one fastening portion, and the catch noses which are connected to the reach-through portions of the plurality of reach-through portions are configured to engage behind the damper mass carrier along at least two back engagement directions which are noncollinear and/or which are opposite one another with respect to a cylindrical coordinate system having a cylindrical coordinate axis which coincides with the axial direction. This makes it possible to further enhance the mechanical fastening of the supporting body to the damper mass carrier using simple constructional means without impeding assembly. There can be a direct connection to one or more fastening portions at the exactly one retaining portion which enters into contact with or is in contact with the damper mass in the at least one operating situation, i.e., for example, the stoppage of the tuned mass damper. At one or more or all of the fastening portions, a plurality of reach-through portions, i.e., at least two reach-through portions, are then also directly connected to exactly that fastening portion in question. Each of the reach-through portions then has a catch nose that engages behind the damper mass carrier along the back engagement direction. In this case, the back engagement directions can be noncollinear, for example; however, they can also extend in opposite directions within the meaning of a mathematical vector. Using a configuration of this kind, it may be possible, for example, to conduct the forces occurring on the supporting body during operation into the damper mass carrier via a plurality of retaining noses and reach-through portions for each fastening portion. It may be possible in this way to reduce the mechanical loading for each individual reach-through portion and each individual retaining nose. Additionally or alternatively, it may be possible by a different geometric arrangement also to improve mechanical securing against radial displacements or displacements taking place in circumferential direction that occur in operation, for example. Tilting moments, which are generated, for example, when the damper masses make contact, can also possibly be diverted better into the damper mass carrier. However, a construction of this kind may also entail a greater space requirement, for which reason it may also be advisable to also only implement a reach-through portion with one or more retaining noses for each fastening portion.

Additionally or alternatively in a tuned mass damper, the catch structure can further comprise a guide portion configured to drive and/or guide the supporting body perpendicular to the back engagement direction along a guide direction with respect to a cylindrical coordinate system having a cylindrical coordinate axis coinciding with the axial direction. This can make it possible to achieve a more mechanically stable guiding and/or driving of the supporting body also in a guide direction perpendicular to the back engagement direction without also burdening the reach-through portions with this task, for example. This can make it possible based on one or more guide portions to achieve operating reliability by relieving the reach-through portions and catch noses which are responsible for the actual latching.

In a tuned mass damper of this kind, the guide portion may optionally be further configured to drive or guide the supporting body with the guide direction, or the catch structure further has an additional guide portion configured to drive or guide the supporting body with the guide direction. This can make it possible to further enhance operating reliability by also implementing the additional supporting function opposite the guide direction.

In a tuned mass damper of this type, the guide portion and/or the further guide portion can optionally have a thickness along the back engagement direction such that the guide portion or further guide portion is substantially dimensionally stable against deformations along the back engagement direction. This can make it possible to facilitate production of the supporting body by using the same material, but in different thicknesses, for the guide portion and the portion or portions responsible for latching.

Additionally or alternatively in a tuned mass damper, the catch structure can be arranged along a circumferential direction around the axial direction between two damper masses arranged adjacently along the circumferential direction. This can make it possible to economize on radial installation space in that the positive engagement connection is generated along the circumferential direction between the damper masses. This can make it possible to arrange the damper masses in an overlapping manner or at the same height with respect to radial direction, which can in turn allow a more efficient utilization of installation space available in radial direction. Two objects or structures can be adjacent when no other object or structure of the same type is arranged therebetween. Corresponding objects or structures can be directly adjacent when they directly adjoin one another, i.e., for example, when they contact one another.

Additionally or alternatively in a tuned mass damper, the damper mass can comprise a first partial damper mass and a second partial damper mass, and the first partial damper mass is arranged along the axial direction at a first side of the damper mass carrier, and the second partial damper mass is arranged at a second side of the damper mass carrier remote of the first side along the axial direction. The first partial damper mass and the second partial damper mass can be mechanically connected to one another. The tuned mass damper can then be constructed such that only the first partial damper mass can enter into contact with or be in contact with a supporting body, i.e., with the supporting body or, in case of a plurality of supporting bodies, with any supporting body at all, in the at least one operating situation, i.e., for example, the stopped condition. For example, the second partial damper mass can also not enter into contact with the supporting body or any supporting body during a stoppage or at least under some operating conditions that may be independent from the rotational speed of the tuned mass damper or of a corresponding torsional vibration damper. However, it can also be possible that the second partial damper mass can enter into contact with or be in contact with a further supporting structure under certain operating conditions. Accordingly, because of the damper masses formed of at least two parts, arranged on both sides of the damper mass carrier and connected to one another, the supporting body can be arranged only on one side of the damper mass carrier at least with a portion with which the damper mass enters into contact or is in contact. Accordingly, this can be a one-sided construction or a one-sided supporting body. This can make it possible to save axial installation space that can be used, for example, for other structures or components of a torsional vibration damper or of the tuned mass damper.

Additionally or alternatively in a tuned mass damper, the supporting body can have an annular retaining portion configured to be in contact with or enter into contact with the damper mass. Because of the annular configuration of the retaining portion, it can be possible to facilitate assembly by reducing the structural component parts to be installed.

Additionally or alternatively, it can be possible to make it easier for the damper mass to enter into contact with or be in contact with the retaining portion in a number of operating situations. This can make it possible to further increase comfort. An operating situation can be dependent upon rotational speed, whereas an operating condition within the framework of the present description can be independent from a rotational speed of the tuned mass damper or of a torsional vibration damper, for example.

Additionally or alternatively in a tuned mass damper, the supporting body can have a retaining surface that faces radially outward and is configured to be in contact with or enter into contact with the damper mass. The retaining surface can be arranged in such a way that the damper mass enters into contact with or is in contact with the retaining surface by a radially inner contacting surface of the damper mass. This can make it possible to positively affect comfort and/or the installation space requirement. The retaining surface can be arranged, for example, at a radially outer contour of the retaining portion.

Additionally or alternatively in a tuned mass damper, the supporting body can extend completely or substantially completely around the axial direction. This can make it possible to reduce the number of component parts to be installed and, accordingly, to further simplify assembly. Additionally or alternatively, it may also be possible to improve comfort in that contact can be produced between the damper mass and the supporting body more easily in different operating situations. For example, the supporting body can extend around the axial direction by at least 270°, at least 300° or at least 350°.

Additionally or alternatively in a tuned mass damper, the supporting body can be produced in one piece and/or integrally. This can make it possible to facilitate the production and/or the assembly of the tuned mass damper, i.e., for example, of the supporting body at the damper mass carrier. A component formed in one piece may be, for example, a component made from precisely one contiguous piece of material. A component or structure made, provided or produced in one part or a component or structure made, provided or produced integral with at least one further component can be, for example, a component or structure that cannot be separated from the at least one further component without destroying or damaging one of the at least two components concerned. Accordingly, a one-piece structural component part or a one-piece component is also at least a structural component part or component formed integral with, or forms one part with, another structure of the relevant structural component part or component.

Alternatively in a tuned mass damper, the supporting body can also be segmented. The segments of the supporting body can optionally also be directly connected to one another. Additionally or alternatively, the supporting body can comprise a plurality of identical segments, i.e., can be indirectly or directly connected to or coupled with one another. A mechanical coupling of two components includes a direct as well as an indirect coupling, i.e., for example, a coupling via a further structure, a further object or a further component.

Additionally or alternatively in a tuned mass damper, the supporting body can comprise a plastic. The plastic can comprise, for example, a thermoplastic, for example, a polyamide. For example, the supporting body can be made in its entirety from a material which includes the plastic. It can even be made of the plastic in question. Of course, thermoset plastics or elastomeric plastics may also be used instead of thermoplastics. The plastic can optionally be fiber-reinforced to increase a mechanical loadability of the plastic, for example. For example, carbon fiber reinforced plastic (CFRP) or glass fiber reinforced plastic (GFRP) can be used as fibers. Regardless of the type of fiber used, they can have a maximum length of 10 mm or can be at least 10 mm long, for example. The plastic can be an injection moldable plastic, for example, so that the supporting body can be produced in part or completely as an injection molded part.

Additionally or alternatively in a tuned mass damper, the damper mass carrier can be a hub disk of a rotational vibration damper. For example, a tuned mass damper can be integrated in a larger torsional vibration damper with a rotational vibration damper for efficient utilization of installation space. In this case, a rotational vibration damper typically comprises a plurality of energy storage elements which, for example, can be implemented as springs or can comprise springs via which, however, in contrast to a tuned mass damper, the rotational movement is transmitted. In contrast, in a tuned mass damper, for example, the rotational movement is not transmitted via the damper masses functioning as energy storage elements. In a tuned mass damper, these damper masses are only coupled to the structural component part that transmits the rotational movement, i.e., for example, the damper mass carrier. Accordingly, for example, a torsional vibration damper can comprise a tuned mass damper and/or a rotational vibration damper. Thus, within the meaning of the present description, the term "torsional vibration damper" is used as parent term.

A torsional vibration damper in which a damper mass and a damper mass carrier are also used will be described in the following. For example, they can be part of a tuned mass damper such as that described above. It is possible, but by no means necessary, to implement the tuned mass damper or tuned mass damper portion of a torsional vibration damper, to be described hereinafter, in accordance with the embodiment described above.

A torsional vibration damper for damping a vibration component of a rotational movement around an axial direction, for example, for a drivetrain of a motor vehicle, comprises a damper mass configured to carry out an oscillation depending on the rotational movement in order to damp the vibration component of the rotational movement. The torsional vibration damper further comprises a damper mass carrier configured to movably guide the damper mass, and a supporting body configured to be in contact with or to enter into contact with the damper mass in at least one operating situation of the torsional vibration damper, such as stoppage of the torsional vibration damper, and the supporting body is connected to the damper mass carrier in order to drive the supporting body relative to the damper mass carrier during rotation of the damper mass carrier, and a support structure formed together with the supporting body to radially support the supporting body under a first operating condition and to radially release the supporting body under a second operating condition which differs from the first operating condition. The first and/or or second operating condition can be independent from a speed of the torsional vibration damper or tuned mass damper.

The use of a torsional vibration damper of this type can make it possible to improve the above-mentioned compromise with respect to operating reliability, simple assembly, construction, comfort, efficient utilization of installation space, and weight in that the supporting body is radially supported under the first operating condition, while the supporting body is radially released under the second operating condition so that when the first condition is present the supporting body can be additionally protected from damage by means of the radial support.

Optionally in a torsional vibration damper, the first operating condition can include dropping below a predetermined first temperature. It is precisely at low temperatures that there is an increased risk in many materials of overloading due to mechanical loads such as when coming into contact or being in contact with the damper mass. Accordingly, when a temperature falls below the predetermined first temperature, the supporting body may be exposed to a greater risk for damage.

Optionally in a torsional vibration damper of this kind, the second operating condition can comprise exceeding a predetermined second temperature. For example, the second predetermined temperature can be a temperature at which there is sufficient likelihood with respect to the life of the torsional vibration damper that the expected loads on the supporting body no longer result in damage to the supporting body when the supporting body is not additionally radially supported by the support structure. The operating reliability can also be further improved in this way.

Optionally, the second temperature can be greater than or equal to the first temperature.

Additionally or alternatively in a torsional vibration damper, the supporting body can be made of a material which has a higher thermal expansion coefficient than a material from which the support structure is made. It is in precisely such a case that an additional protection of the supporting body through the radial support by the support structure can improve the operating reliability. The thermal expansion coefficient can be, for example, the linear thermal expansion coefficient or the volumetric expansion coefficient. Accordingly, the thermal expansion coefficient can indicate the relative longitudinal expansion along a direction or a relative change in volume of the respective structural component part or of the respective structure, i.e., in this case, of the support member or support structure, with respect to a predetermined temperature interval.

Optionally in a torsional vibration damper of this type, the material of the supporting body can have a thermal expansion coefficient which is at least 1.5 times the thermal expansion coefficient of the material of the support structure. The operating reliability can possibly be enhanced in just such a case through the use of a torsional vibration damper such as that described above.

Additionally or alternatively in a torsional vibration damper, the supporting body can comprise a plastic, and the support structure can be made from a metal or a metal alloy. In a situation of this kind there may be greater damage to the supporting body during the first operating condition, for example, due to embrittlement of the plastic or other corresponding effects. As was described above, the plastic can be a thermoplastic, for example, i.e., a polyamide, for example. However, the plastic can also be an elastomer or thermoset plastic. The plastic can optionally be fiber-reinforced, i.e., strengthened with respect to mechanical loadability by glass fibers and/or carbon fibers, for example. The fibers can have a maximum length of 10 mm and be at least 10 mm long.

Of course, a metal can include impurities inherent to production. Metal alloys typically include at least one further alloy component besides a metallic alloy component, i.e., for example, a metallic element. The further alloy component can again be a metal or metallic element, for example, but may also be a nonmetallic material or nonmetallic element, i.e., for example, carbon such as is used in steel. Of course, more than two alloy components can also be used as is common in the steel industry, for example. Further, fiber reinforcement can also be implemented in case of metal alloys. However, other components can also be added to a material of this type, such as in the form of fibers, i.e., for example, carbon fibers or glass fibers, minerals or fillers to name only a few examples. Of course, all of these materials can have impurities. Steel and brass are examples of alloys.

Additionally or alternatively in a torsional vibration damper, an input component part of the torsional vibration damper, an output component part of the torsional vibration damper or an intermediate component part of the torsional vibration damper can include the support structure. The input component part of the torsional vibration damper can be, for example, the structural component part into which is coupled the rotational movement with the rotational irregularities. Correspondingly, the output component part can be the structural component part at which the rotational movement with the damped rotational irregularities or rotational vibrations can be tapped. The intermediate part may be any structural component part of the torsional vibration damper that also rotates around the axial direction. This can make it possible to make more efficient use of the installation space in that the support structure is integrated in an existing component part or connected to the latter as a separate component part. Optionally, the support structure may be formed integral with the input component part, the output component part or the intermediate component part. However, the support structure may also optionally be connected as separate component to the input component part, the output component part or the intermediate component part.

Additionally or alternatively in a torsional vibration damper, the supporting body can further be connected to the damper mass carrier to be radially guided by the damper mass carrier during the first and second operating conditions. Accordingly, the supporting body can possibly also be guided independently from the support structure with respect to its radial position in the torsional vibration damper through the damper mass carrier so that, depending on the specific configuration, operating reliability, assembly, construction, comfort or also efficient use of installation space can be improved. For example, the position of the supporting body can possibly be better controlled by a corresponding radial guiding, which can add to comfort and operating reliability.

Optionally in a torsional vibration damper of this type, the damper mass carrier can be configured to guide the supporting body radially in the same direction as the support structure supports the supporting body. In this way, the support structure can enable a supplemental or additional support during the first operating condition, so that the support structure can be realized in a smaller, more lightweight manner or in some other manner with simpler constructional elements.

Additionally or alternatively in a torsional vibration damper, the support structure can be configured to support the supporting body radially inwardly. Likewise additionally or alternatively in a torsional vibration damper, as has already been mentioned, the supporting body can further be connected to the damper mass carrier so as to be axially secured by the damper mass carrier. It can be possible by both steps, independently from one another or in combination, to improve the compromise mentioned above. For example, operating reliability can possibly be improved through the axial securing. The efficient utilization of installation space can possibly be further enhanced through the radial support on the inner side.

Additionally or alternatively in a torsional vibration damper, the support ring can have a support surface configured to enter into contact with or be in contact with a complementary support surface of the supporting body in order to support the supporting body. The support surface of the support structure can be specifically adapted to the supporting body in order, for example, to prevent mechanical point loading or to reduce tilting moments.

For example, in a torsional vibration damper according to an embodiment example, the support surface and the complementary support surface have in each instance at least partially a contour in a cross-sectional plane along the axial direction and radial direction such that one contour is adapted to the other. This can make it possible to reduce tilting moments or other loads adversely affecting the supporting body or the support structure.

Optionally in a torsional vibration damper, the support surface and the complementary support surface have in each instance at least partially a contour in a cross-sectional plane along the axial direction and radial direction, which contours allow a line-shaped contact. This can make it possible to reduce the above mentioned tilting moments and material loading at individual points and therefore to improve operating reliability.

As has already been described in connection with the tuned mass damper, it is also possible in addition or alternatively in a torsional vibration damper that the damper mass comprises a first partial damper mass and a second partial damper mass, and the first partial damper mass is arranged along the axial direction at a first side of the damper mass carrier, and the second partial damper mass is arranged at a second side remote of the first side along the axial direction. The first partial damper mass and the second partial damper mass can be mechanically connected to one another, the torsional vibration damper being configured such that only the first partial damper mass can enter into contact with or be in contact with a supporting body during the at least one operating situation, i.e., for example, stoppage, as has already been described by way of example.

Additionally or alternatively, a torsional vibration damper can further comprise a rotational vibration damper with a plurality of energy storage elements arranged along the circumferential direction, via which energy storage elements the rotational movement is transmitted in order to damp the vibration component or a further vibration component of the rotational movement, and the plurality of energy storage elements is arranged in a channel which is at least partially covered by a cover component part. The cover component part can include the support structure. This can make it possible to use the cover component part of the energy storage elements to enable the previously described support of the supporting body. Accordingly, this can make it possible to reduce the total number of components and structural component parts and thus to simplify production and assembly of a torsional vibration damper.

Optionally in a torsional vibration damper of this kind, the rotational vibration damper can be arranged radially inside the damper mass. This can make it possible to further increase efficient utilization of installation space and to make use of a rotational vibration damper arranged radially inside of the tuned mass damper and the corresponding cover component part of the rotational vibration damper for radial support.

Additionally or alternatively in the torsional vibration damper, the energy storage elements can comprise at least one spring, and it may be possible, for example, to enable a constructionally simple but reliable implementation of a rotational vibration damper of this kind.

Additionally or alternatively, the cover component part can be a cover plate, and the support structure is formed by a reshaped portion of the cover plate. In this way, the additional functionality can be provided by very simple constructional elements through an additional reshaping or other corresponding shaping step. This can be carried out, for example, in the course of the same production step as the shaping of the actual cover structure so that production can be further simplified. Moreover, through skillful utilization of the cover plate, a mechanically very stable and accordingly loadable construction which enhances operating reliability can be used without adding significantly to the weight. Accordingly, it may be possible to adapt the shape of the support structure and that of the supporting structure and supporting body, respectively, to one another.

Additionally or alternatively in a torsional vibration damper according to an embodiment example, the plurality of energy storage elements between the damper mass carrier and the cover component part can be coupled to allow a rotation of the damper mass carrier relative to the cover component part. For example, the cover component part can be an intermediate component part or a structural component connected to the output component part or even the output component part of the torsional vibration damper itself. For example, the cover component part can include corresponding positions so as to contact or enter into contact with the energy storage elements in order to absorb or transmit the forces and moments occurring during the transmission of the rotational movement. The cover component part can contact the energy storage elements at the same time. In this way also, it may be possible to simplify the construction of, and possibly the assembly of, a torsional vibration damper of this kind.

A further embodiment of a torsional vibration damper which can also comprise a tuned mass damper such as was described above will be described in the following. However, another tuned mass damper comprising a damper mass and a damper mass carrier can also be used as will be explained later.

A torsional vibration damper for damping a vibration component of a rotational movement around an axial direction, for example, for a drivetrain of a motor vehicle, comprises a damper mass configured to carry out an oscillation depending on the rotational movement in order to damp the vibration component of the rotational movement. The torsional vibration damper further comprises a damper mass carrier configured to movably guide the damper mass, and a supporting structure and a further supporting structure. The further supporting structure is configured to be in contact with or to enter into contact with the damper mass in at least one operating situation of the torsional vibration damper. The supporting structure is configured to be in contact with or enter into contact with the damper mass under a second operating condition which differs from the first operating condition and in at least one operating situation of the torsional vibration damper.

The first operating condition and/or the second operating condition can be independent, for example, from a rotational speed of the torsional vibration damper or tuned mass damper. The at least one operating situation in which the damper mass enters into contact with or is in contact with the supporting structure can include, for example, a stoppage of the torsional vibration damper or tuned mass damper, dropping below a predetermined limiting speed and/or an operating state in which the damper mass carries out an oscillation with an oscillation amplitude that is greater than a predetermined threshold value. This likewise applies to the at least one operating situation in which the damper mass enters into contact with or is in contact with the further supporting structure. The operating conditions with respect to the supporting structure and the further supporting structure may be completely or partially identical. They can also differ completely or partially, for example, with respect to individual parameters such as the threshold values in question. However, they can also be completely different.

A torsional vibration damper can further improve the compromise mentioned above with respect to operating reliability, simple assembly, simple construction and production, comfort, efficient utilization of installation space and economizing on weight by providing not only one supporting structure but a further supporting structure, and under the first operating condition the damper mass enters into contact with or is in contact with the supporting structure when the torsional vibration damper is stopped. However, under the second operating condition, the further supporting structure enters into contact with the damper mass. Accordingly, depending on the operating condition which may be independent from the speed of the torsional vibration damper or tuned mass damper, for example, the damper mass can enter into contact with or be in contact with the supporting structure or the further supporting structure depending on the speed. A protection for the supporting structure, for example, can accordingly be realized in that additionally or alternatively the further supporting structure enters into contact or is in contact with the damper mass under the second operating condition.

Optionally in a torsional vibration damper, the supporting structure can be configured to be spaced apart from the damper mass or to release the damper mass under the first operating condition and in the at least one operating situation of the torsional vibration damper. This can make it possible with the aid of the further supporting structure to completely relieve the supporting structure under the first operating condition in that the damper mass no longer enters into contact with or is in contact with the supporting structure. This can make it possible to enhance operating reliability in that the supporting structure is protected against damage which can occur, for example, during the first operating condition. It may also be possible to improve comfort in that the damper mass does not enter into contact or is not in contact with the supporting structure under the first operating condition so that noise generation can be reduced, for example.

Additionally or alternatively in a torsional vibration damper, the further supporting structure can be configured to be spaced apart from the damper mass under the second operating condition and in the at least one operating situation of the torsional vibration damper. In a manner analogous to the case mentioned above, a protection for the further supporting structure can possibly also be at the forefront. However, additional comfort, for example, can also be achieved in that a noise which occurs when the further supporting structure encounters the damper mass can be prevented. Here also, under the second operating condition the further supporting structure can also possibly release the damper mass during at least one operating situation of the torsional vibration damper, i.e., for example, the stoppage of the torsional vibration damper.

Additionally or alternatively in a torsional vibration damper, as has already been mentioned, the first operating condition can include falling below a predetermined first temperature. In a torsional vibration damper of this type, the second operating condition can optionally include exceeding a predetermined second temperature. In a torsional vibration damper, the second temperature can optionally be greater than or equal to the first temperature. Depending on the specific configuration of a torsional vibration damper of this type, as was already mentioned, a protection of the supporting structure can result in this way to name only one example.

Additionally or alternatively in a torsional vibration damper, the supporting structure can be formed by a supporting body. For example, a supporting body can be used as has already been described. However, a supporting body diverging from this supporting body can also be used.

Optionally in a torsional vibration damper of this type in which the supporting structure is formed by a supporting body, this can have a retaining portion which is configured to be in contact with or enter into contact with the at least one damper mass, and the retaining portion is annular. In this way too, as has already been mentioned, a simpler assembly can possibly be achieved. Likewise or alternatively, it may be possible to simplify a construction of a torsional vibration damper of this kind.

Additionally or alternatively in a torsional vibration damper according to an embodiment example, the supporting structure can extend completely or substantially completely around the axial direction. This can make it possible to further enhance operating reliability in that the damper mass can possibly enter into contact with or be in contact with the supporting structure in a large number of different positions. In this case too, for example, the supporting structure can extend around the axial direction by at least 270°, by at least 300° or by at least 350°. Additionally or alternatively, comfort can possibly also be improved in that the damper mass can enter into contact with or be in contact with the supporting structure in different operating situations.

Additionally or alternatively in a torsional vibration damper, the supporting structure can be made from a material having a higher thermal expansion coefficient than a material from which the further supporting structure is made. Accordingly, it can be possible, depending on the existing temperature conditions, to permit the damper mass to enter into contact with or be in contact with the supporting structure or the further supporting structure in at least one operating situation of the torsional vibration damper, i.e., for example, when the torsional vibration damper is stopped. Material effects brought about by the temperature can also possibly be reduced in this way.

As has already been mentioned, in a torsional vibration damper of this type the material of the supporting body can optionally have a thermal expansion coefficient that is at least 1.5 times that of the thermal expansion coefficient of the material of the further supporting structure. Precisely in a situation of this kind, it may possibly be useful to implement the supporting structure and the further supporting structure for increasing the operating reliability and/or comfort.

Additionally or alternatively in a torsional vibration damper, the supporting structure can comprise a plastic, and the further supporting structure is made from a metal or metal alloy. As has already been described, the plastic can be, for example, a thermoset plastic, a thermoplastic or an elastomer. An example of a thermoset plastic is polyamide, and regardless of the type of plastic, this plastic can be formed so as to be mechanically loadable through addition of fibers, i.e., configured as fiber-reinforced plastic. The fibers can be, for example, glass fibers or carbon fibers. In this respect, short fibers, i.e., for example, fibers with a maximum length of at most 10 mm, as well as longer fibers with a length of at least 10 mm, for example, can be used. As has already been mentioned, aside from a metal which, of course, can contain impurities inherent to the production process, metal alloys, for example, can also be used. Metal alloys typically include at least one further alloy component besides a metallic alloy component, which can again be a metal. The further alloy component in turn can be a metal, for example, but may also be a nonmetallic material, for example, carbon such as is used in steel. Of course, more than two alloy components can also be used as is common in the steel industry, for example. Further, insofar as it is meaningful, fiber reinforcement can also be implemented in case of metal alloys as has already been described by way of example in connection with the plastics.

As has already been described, additionally or alternatively in a torsional vibration damper, the damper mass can comprise a first partial damper mass and a second partial damper mass, and the first partial damper mass is arranged along the axial direction at a first side of the damper mass carrier, and the second partial damper mass is arranged at a second side remote of the first side along the axial direction. The first partial damper mass and the second partial damper mass can be mechanically connected to one another, and the supporting structure is arranged on the first side and the further supporting structure is arranged on the second side. This can make it possible based on the mechanical connection of the two partial damper masses to one another to configure the torsional vibration damper including supporting structure and further supporting structure such that the supporting structures can be provided at different sides of the damper mass carrier without requiring additional axial installation space so as to minimize the installation space requirement.

Additionally or alternatively in a torsional vibration damper, the supporting structure can be mechanically connected to the damper mass carrier. As has already been described in connection with the supporting body, a corresponding mechanical connection, for example, by positive engagement, can also be carried out in this case. Regardless of its exact configuration, a mechanical connection can serve for driving the supporting structure in circumferential direction, for radial guiding and/or axial securing. In this way, depending on the specific configuration, the operating reliability, comfort or other aspects of those mentioned above can possibly be positively influenced.

Additionally or alternatively, a torsional vibration damper can further comprise a rotational vibration damper with a plurality of energy storage elements arranged along the circumferential direction and via which the rotational movement is transmitted in order to damp the vibration component or a further vibration component of the rotational movement. The plurality of energy storage elements can be coupled to a control component part, and the control component part comprises the further supporting structure. Accordingly, the tuned mass damper, including its damper mass and its damper mass carrier, can be coupled, for example, to a rotational vibration damper to allow the damping of the vibration component or of a further vibration component. The control component part can be utilized at the same time to control the energy storage elements for implementing the further supporting structure so that the assembly and the production of the torsional vibration damper can possibly be facilitated. The control component part can directly contact or indirectly contact the energy storage elements, i.e., for example, can directly abut the latter. Accordingly, the rotational movement can be coupled into and coupled out of the energy storage elements via the control component part.

In a torsional vibration damper of this kind, the rotational vibration damper can be arranged radially inside of the damper masses. This can make it possible to make more efficient use of the installation space for the torsional vibration damper.

Additionally or alternatively in a torsional vibration damper, the energy storage elements can comprise springs. This can make it possible to achieve a corresponding damping in a simple constructional manner. As the case may be, it can also be possible to simplify assembly in this way.

Additionally or alternatively in a torsional vibration damper, the control component part can be a control plate, and the further supporting structure is formed by a reshaped portion of the control plate. This can make it possible again with simple constructional way to produce the further supporting structure as part of the control plate and accordingly to simplify the production or construction and assembly. Moreover, a very mechanically stable configuration of the further supporting structure which accordingly enhances operating reliability may be possible by skillful introduction of forces or moments.

Additionally or alternatively in a torsional vibration damper, the plurality of energy storage elements between the damper mass carrier and the control component part can be coupled to enable a rotation of the damper mass carrier relative to the control component part. In other words, the damper mass carrier can likewise serve as control component part or be implemented as part of a control component part. This can make it possible to reduce the number of installed component parts and, in this way, to facilitate construction or production and assembly.

Additionally or alternatively in a torsional vibration damper, the plurality of energy storage elements can be arranged in a channel, and the control component part at least partially covers the channel. In this way, it can also be possible again to integrate a number of functions in one component part and thus to facilitate the production or construction and assembly.

In view of the fact that a tuned mass damper, rotational vibration damper and torsional vibration damper are configured so as to rotate during operation, the present description is always predicated on a cylindrical coordinate system having a cylinder axis which typically corresponds to or coincides with the axial direction of the rotational movement and therefore the axial direction of the torsional vibration damper, tuned mass damper and rotational vibration damper. Accordingly, any point or any direction or line through an axial component, a radial component and a component in circumferential direction can be described within the framework of the cylindrical coordinate system. While the radial direction and the circumferential direction, for example, may depend on one another in a Cartesian coordinate system, the following description and the preceding description are always based on the same radial direction regardless of the respective angle along the circumferential direction. This also applies in a corresponding manner for the circumferential direction. Thus while in a corresponding cylindrical coordinate system the unit vectors for the circumferential direction and the radial direction in the Cartesian coordinate system are not constant, "radial direction" within the meaning of the present description always denotes that direction following the corresponding radial unit vector. This also applies correspondingly to the circumferential direction.

However, it should be noted in this connection that not all of the terms which include the word "direction" are actually to be understood within the meaning of mathematical vectors such as the unit vectors mentioned above. Accordingly, it is even usual to describe mere lines by the word "direction". One example is the axial direction which, unless otherwise indicated, lies along the line given by the corresponding unit vector but which can also be directed opposite to the vector. This also applies for the radial direction and the circumferential direction which follow the direction given by the corresponding unit vector but which can also extend in the opposite direction. In contrast, the back engagement direction and the guide direction actually represent a vector in the mathematical sense in this case.

The motor vehicles include, for example, passenger cars as well as commercial vehicles, busses, agricultural machinery, work machinery, rail vehicles and other land-based vehicles. Further, however, motor vehicles can also include water-bound motor vehicles and mixed forms of the above-mentioned motor vehicles which can operate on land as well as on or in water.

Many of the components, objects and structures described herein can be carried out in a rotationally symmetrical manner. A component can have an n-fold rotational symmetry, for example, where n is a natural number greater than or equal to 2. An n-fold rotational symmetry exists, for example, when the relevant component can be rotated by (360°/n) around an axis of rotation or axis of symmetry and substantially transitions into itself with respect to shape, i.e., substantially self-maps in a mathematical sense after a certain rotation. In contrast, a completely rotationally symmetrical component substantially transitions into itself with respect to shape when rotated by any amount and by any angle around the axis of rotation or axis of symmetry, i.e., substantially self-maps in the mathematical sense. An n-fold rotational symmetry and a complete rotational symmetry are both referred to herein as rotational symmetry.

A frictional engagement connection is brought about through static friction, a bonding connection is brought about through molecular or atomic interactions and forces, and a positive engagement connection is brought about through a geometric connection of the relevant parts to be connected. Therefore, static friction generally presupposes a normal force component between the two parts to be connected. A frictional engagement contact or frictional engagement connection exists when two objects enter into frictionally engaging contact with one another such that a force is formed therebetween in case of a relative movement perpendicular to a contact surface between them, allowing a transmission of force, of a rotational movement or of a torque. In this regard, there can be a difference in rotational speed, i.e., slip, for example. But apart from this type of frictionally engaging contact, a frictional engagement contact also includes a frictional or non-positive engagement connection between the relevant objects in which a corresponding difference in rotational speed, or slip, essentially does not occur.

In an embodiment example of a method, the method steps or processes can be carried out in the specified sequence but also possibly in a diverging sequence. Accordingly, individual method steps or processes may possibly be carried out simultaneously but also at least so as to overlap in time unless otherwise indicated from the description or technical context.

BRIEF DESCRIPTION OF THE DRAWINGS

Various examples will be described and discussed in the following with reference to the accompanying drawings.

FIG. 14 is a perspective view of a subassembly of a torsional vibration damper with a supporting ring such as that shown in FIGS. 1 to 7;

FIG. 15 is a perspective view of the subassembly shown in FIG. 14 from a different perspective;

DETAILED DESCRIPTION OF THE PRESENTLY PREFERRED EMBODIMENTS

Figure 1:
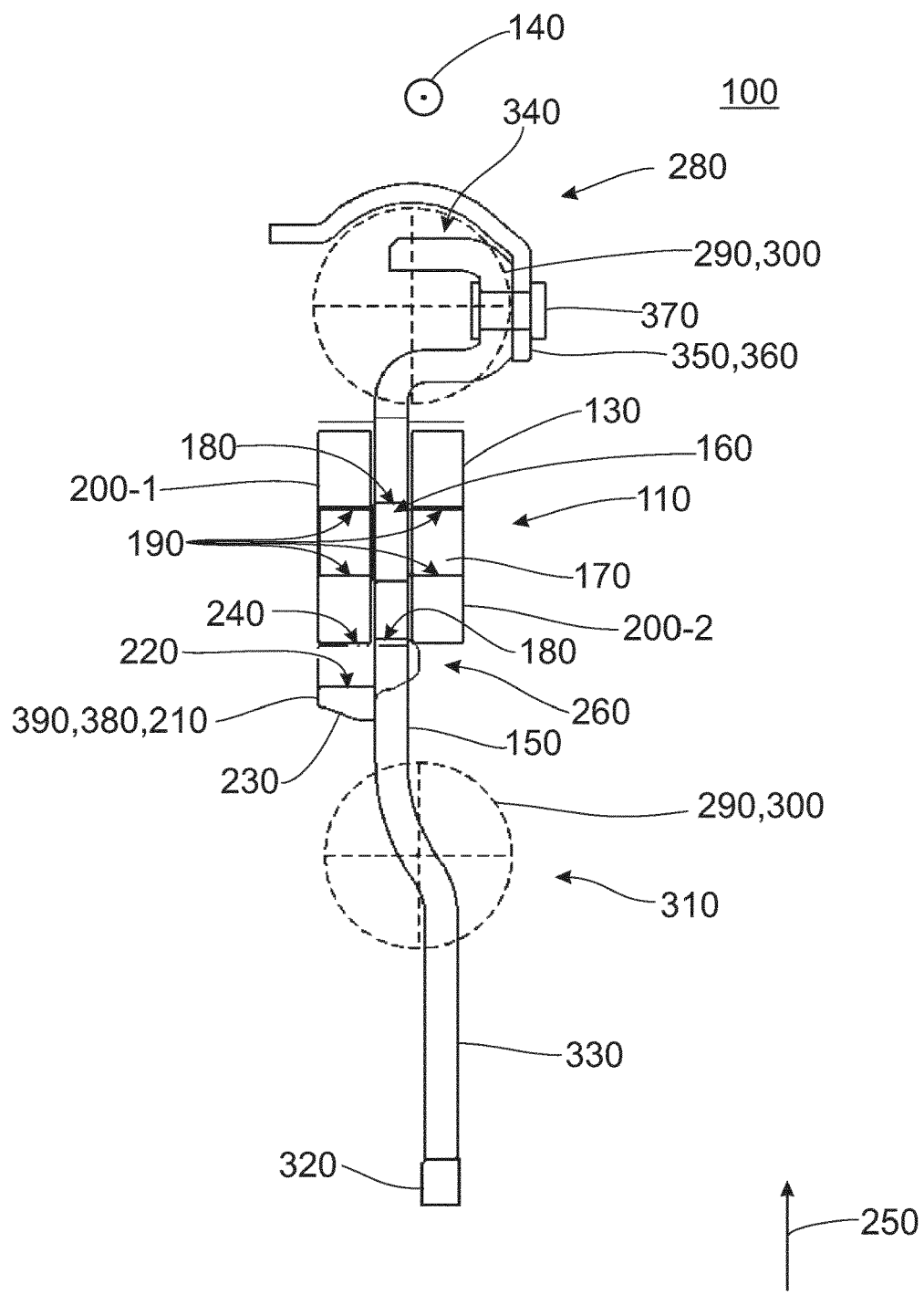
FIG. 1 is a simplified cross-sectional view of a torsional vibration damper with a tuned mass damper.

Identical or comparable components are denoted by identical reference numerals in the following description of the accompanying drawings. Further, collective reference numerals are used for components and objects which occur more than once in an embodiment example or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

As has already been mentioned in the introductory part, it happens in many areas of technology, i.e., for example, plant engineering, automotive engineering, and mechanical engineering, that situations occur in which mechanical energy is transmitted in the form of rotational movements on which rotational irregularities, which can also be called rotational vibrations, are superimposed. Depending upon the application scenario, these rotational irregularities can impair the comfort of the operator or user of the plant or machine in question or the driver; but they can also have negative repercussions for the functional reliability and functional performance or the life of the respective plant, machine or vehicle. This is the reason for the basic approach of eliminating, but at least damping, corresponding rotational irregularities. This can take place, for example, in that the energy contained in the rotational irregularities is temporarily buffered in one or more energy storage elements and correspondingly coupled into the rotational movement again in phase. Corresponding torsional vibration dampers which include, for example, tuned mass dampers and rotational vibration dampers are used for this purpose.

In rotational vibration dampers, the transmission of the rotational movement takes place via the energy storage elements which can be constructed, for example, as springs. Correspondingly, the springs or—broadly speaking—the energy storage elements are controlled by corresponding control structures in direct or indirect contact with the energy storage elements so as to couple the rotational movement into the energy storage elements and to remove the intermediately stored energy again from the energy storage elements. Accordingly, in rotational vibration dampers, the transmission of the rotational movement takes place via the energy storage elements.

In contrast, in tuned mass dampers the transmission of rotational movement does not take place via the energy storage elements. In this case, the energy storage elements can be constructed, for example, in the form of damper masses that move in an effective force field that can be brought about, for example, through superposition of gravitational attraction, centrifugal forces, and other forces acting thereon. In this respect, the damper masses can change their radius, for example, that is, their distance from the axial direction of the rotational movement depending on their respective vibration angle.

Typically, the damper masses are movably guided through a damper mass carrier so that the damper masses can execute their oscillations as a function of the rotational movement in order to damp the vibration component of the rotational movement. The damper mass carrier is coupled into the corresponding torque transmission path in this case merely to transmit the rotational movement. The damper masses themselves are merely coupled with the damper mass carrier, but without the rotational movement actually being transmitted via the latter.

Now it may happen in corresponding tuned mass dampers that the damper masses possibly knock sharply into end stops or comparable structures in different operating situations, which can result in noise and possibly in the development of annoying or even damaging impacts.

While examples of tuned mass dampers and torsional vibration dampers are in no way limited to applications in the drivetrain of a motor vehicle, these situations in particular will be addressed in greater detail in the following for the sake of simplicity. In the field of motor vehicles, for example, torsional vibration dampers and tuned mass dampers are used to damp rotational irregularities generated by piston engines. They are often used between the drive motor, for example, an Otto engine or diesel engine, or a transmission to prevent or at least reduce the coupling of rotational irregularities into the transmission.

Depending on the specific configuration of the drivetrain, a corresponding torsional vibration damper or tuned mass damper can be coupled with a rotating component so as to be fixed with respect to rotation relative to it. For example, when the drive motor is turned off, the relevant components may continue to run for a time but reduce their speed owing to internal friction losses and possibly other effects. Upwards of a determined speed, it may happen that the dominating force acting on the damper masses is no longer the centrifugal force but rather the gravitational force. Thus if the gravitational force exceeds the centrifugal force, the result in some situations can be that the damper masses impact against their structurally determined end stops and generate a knocking or clattering noise until the component in question finally comes to a stop. Accordingly, after the engine is switched off, for example, the transmission input shaft of a drivetrain of this type continues to run. Upwards of a determined speed of the running-down transmission input shaft, the gravitational force exceeds the centrifugal force acting on the individual damper masses, also known as flyweights. In this case, the damper masses can possibly fall into their above-mentioned structurally determined end stops, which are defined, for example, by path curves, spacers or the like. The resulting noises are frequently perceived by the driver, other passengers in the motor vehicle in question or even passers-by as very unpleasant because these noises often sound like metallic clanging. For example, they can be wrongly interpreted by these persons as malfunctions or quality defects.

In order to reduce or even completely suppress the generation of these sounds, supporting structures or supporting bodies are used, the damper masses of a tuned mass damper of this type entering into contact with or being in contact with these supporting structures or supporting bodies at the latest in the stopped condition, frequently already when the speed drops below a predetermined speed. The supporting bodies or supporting structures can be configured such that noise is reduced and/or perceived as less annoying. Accordingly, corresponding supporting bodies and supporting structures can serve to support the damper masses when the engine is switched off, for example, to prevent or reduce clattering noises.

Accordingly, corresponding torsional vibration dampers and tuned mass dampers can be implemented in starting elements of a corresponding drivetrain, for example, torque converters or dry clutches or wet clutches. The transmission can take any form of transmission in principle, i.e., for example, a variable speed transmission or continuously variable transmission. A variable speed transmission can be based, for example, on planetary gear sets and related sets of gears and as well as on meshingly engaging gearwheels on parallel-offset axles. The transmissions can be provided for one or more starting elements, i.e., it can also be a dual clutch transmission, for example. Notwithstanding, the transmission can be controlled electrically, hydraulically or mechanically.

FIG. 1 shows a simplified cross-sectional view through a torsional vibration damper 100 comprising a tuned mass damper 110. As was already mentioned in the introduction, the tuned mass damper 110 and the torsional vibration damper 100 can be used, for example, within the scope of a drivetrain of a motor vehicle, for example, to damp a vibration component of a rotational movement around an axial direction 120. The tuned mass damper 110 comprises at least one damper mass 130 configured to execute an oscillation as a function of the rotational movement precisely so as to damp the vibration component of the rotational movement. In many tuned mass dampers 110, a plurality of damper masses 130 are typically used, these damper masses 130 being distributed along a circumferential direction 140 perpendicular to the axial direction 120. The damper masses 130 can be distributed equidistantly along the circumferential direction 140, for example.

The tuned mass damper 110 further comprises a damper mass carrier 150 which is capable of movably guiding the damper masses 130. In the example shown in FIG. 1, the damper mass carrier 150 is constructed as a reshaped, e.g., deep-drawn, sheet metal which, in addition to the damper mass carrier function, performs additional functions as will be shown later in the continued description.

The damper mass carrier has a guide recess 160 in which at least one rolling element 170 per damper mass 130 engages and rolls on corresponding running paths 180. The guide recess 160 can be kidney-shaped or shaped in some other way, for example.

Further, the rolling element or rolling elements 170 also engage in corresponding complementary running paths 190 of the damper mass 130 and accordingly allow the damper mass 130 to carry out the corresponding oscillation.

The rolling element 170 in the example shown in FIG. 1 is constructed as a stepped rolling element in which the portion of the rolling element contacting the running paths 180 of the damper mass carrier 150 has a greater diameter than the portion contacting the complementary running paths 190 of the damper mass 130. Accordingly, the rolling element 170 can be axially secured by the damper mass 130 arranged on both sides of the damper mass carrier 150.

More exactly, the damper mass 130 is formed of a plurality of parts and has at least a first partial damper mass 200-1 and a second partial damper mass 200-2 that are mechanically connected to one another via a bolt or other type of connection. The position of the mechanical connection of the two partial damper masses 200 is not shown in the cross-sectional plane shown in FIG. 1. The first partial damper mass 200-1 is arranged on a first side along the axial direction 120 of the damper mass carrier 150, while the second partial damper mass 200-2 is arranged on a second side along the axial direction 120 of the damper mass carrier 150 remote of the first side. In other words, the two partial damper masses 200 are arranged on both sides of the damper mass carrier 150 in this case.

The tuned mass damper 110 further has a supporting body 210 configured to be in contact with or enter into contact with the damper mass 130 in at least one operating situation of the tuned mass damper 110, i.e., for example, its stationary state. To this end, the supporting body 210 has a retaining surface 220 arranged at a retaining portion 230. The retaining surface 220 can enter into contact with or be in contact with a contacting surface 240 located in this instance on the radially inner side of the damper mass 130, at the latest during stoppage of the tuned mass damper 110 but also, additionally or alternatively, in another operating situation. Accordingly in the example shown here, the retaining portion 230 is arranged on the radially inner side with respect to the damper mass 130. However, in other examples it may also be advisable to realize a supporting body 210 on the radially outer side.

In the present instance, the radial direction 250 runs along the direction shown in FIG. 1, although this often does not indicate a vector in the mathematical sense in spite of the use of the word "direction". Often, however, the radial direction 250 is conventionally defined toward the outside with increasing radius, that is, proceeding from the axis or axial direction 120.

In the example shown in FIG. 1, the supporting body 210 is connected to the damper mass carrier 150 by positive engagement via a catch structure 260, and the catch structure 260 engages in a corresponding catch aperture 270 of the damper mass carrier 150. The configuration of a supporting body 210 of this type will be described more exactly in the following in connection with FIGS. 2 to 7.

As has already been briefly mentioned, the damper mass carrier 150 is constructed in the present example as a sheet metal component which carries out additional functions besides the damper mass carrier function. More exactly, the torsional vibration damper 100 comprises a first rotational vibration damper 280 arranged radially outwardly of the damper masses 130 and for which the damper mass carrier 150 also serves as control component part. The first rotational vibration damper 280 has a plurality of springs 290 that, as energy storage elements 300, are coupled between an input component part—not shown in FIG. 1—of the first rotational vibration damper 280 and the control component part, i.e., the damper mass carrier 150 in the present instance, serving as output component part of the first rotational vibration damper 280. Accordingly, the rotational movement, which is coupled into the rotational vibration damper 280 in the embodiment example not shown in FIG. 1, is transmitted to the springs 290 or energy storage elements 300 and, from there, the rotational movement is in turn transmitted to the damper mass carrier 150. Here, the tuned mass damper 110 is a second damper stage that damps or can even completely eliminate the corresponding rotational irregularities of the rotational movement.

The torsional vibration damper 100 further has a second rotational vibration damper 310. For the sake of simplicity, only the springs 290 or energy storage elements 300 of the second rotational vibration damper 310 are shown in FIG. 1. The damper mass carrier 150 serves as a control component part for the second rotational vibration damper 310 as well, but this time on one side. Depending on the specific configuration of the damper mass carrier 150, this damper mass carrier 150 can be guided and supported radially and possibly also axially at an output hub via a bearing portion 320. For this reason, the damper mass carrier 150 or the component part which forms it is also referred to as hub disk 330. Accordingly, the hub disk 330 serves not only as damper mass carrier 150, but also as output-side control component part of the first rotational vibration damper 280 and as input-side control component part of the second rotational vibration damper 310.

Of course, instead of the bearing portion 310, a toothing or other corresponding connection transmitting a rotational movement can also be made with the output hub and another corresponding component part such that the hub disk can also be connected directly or indirectly to the output component part of the torsional vibration damper 100.

For the sake of completeness, it is noted here that the energy storage elements 300 of the first rotational vibration damper 280 are arranged in a channel 340 formed at least partially by a cover component part 350 in the form of a cover plate 360. The cover component part 350 in the present instance is mechanically connected via one or more rivets 370 to the hub disk 330, i.e., the damper mass carrier 150, so as to be fixed with respect to rotation relative to it. By arranging the energy storage elements 300 in the channel 340, it may be possible to reduce or even prevent a rubbing of the energy storage elements at a housing—not shown in FIG. 1—of the torsional vibration damper 100 or another corresponding structure or housing because, as a result of the rotational movement, the energy storage elements 300 are likewise subjected to centrifugal force and are therefore pressed outward, possibly against the cover component part 350.

More exactly, the supporting body 210 is a supporting ring 380 that extends completely or at least substantially completely around the axial direction 120 as will be described in the following. The supporting body 210 or supporting ring 380 is a specific form of a supporting structure 390 that can be constructed in a torsional vibration damper 100 or a tuned mass damper 110 to be in contact with or enter into contact with the damper mass 130. Depending on the specific configuration, this can also depend, for example, on a determined operating condition. Within the meaning of the present description, an operating condition can be independent from the speed, for example. An operating situation can include a determined speed. The operating condition can be a determined temperature, for example.

Accordingly, on the whole, a one-sided step against unwanted noise, i.e., a one-sided acoustical step, is implemented in the form of the supporting body 210 in the solution shown in FIG. 1. This supporting body 210 is connected, proceeding from the left-hand side in FIG. 1, to the damper mass carrier 150 by positive engagement by a catch function. As will be shown in the following description, the catch nose and, therefore, the catch function is directed upward and radially outward. Of course, the corresponding catch functions can also be implemented at other locations, for example, at the bottom, i.e., radially inward, or in both directions or also in circumferential direction. The corresponding supporting body 210 can, of course, also be arranged on the other side of the damper mass carrier 150. Accordingly, in a corresponding configuration of the catch aperture 270, the catch noses of the catch structure 260 which are shown later can be implemented at the top, at the bottom, at the top and the bottom, alone or in combination with lateral catches, i.e., catches arranged along the circumferential direction 140. This may make it advisable to adapt the corresponding hole in the damper mass carrier 150 (catch aperture 270) to the appropriate functionality.

The supporting body 210, also referred to as acoustical step, or the corresponding supporting structure 390 can be axially secured via the positive engagement connection.

In addition to axially securing, the catch structure with its retainer noses, which are to be described later, can also be used to secure in circumferential direction. To this end, the catch noses can be positioned in circumferential direction between the damper masses 130, also called flyweights, as has already been indicated in FIG. 1. This can make it possible to ensure the smooth running of the damper masses 130 even in unfavorable operating situations, i.e., for example, a maximum possible deflection of the flyweights. The supporting body 210 serving to reduce acoustical effects, for example, can be formed through the positive engagement connection, for example, in the form of the catch means, inside the motion link of the hub disk 330 or of the damper mass carrier 150, also referred to as path plate. Depending on the planned area of use, a wide variety of arrangements of the damper masses 130 can be used. For example, an appropriate arrangement of or partitioning of the damper masses 130 can be implemented for a three-cylinder application, a four-cylinder application, a five-cylinder application or a six-cylinder application.

Figure 2:
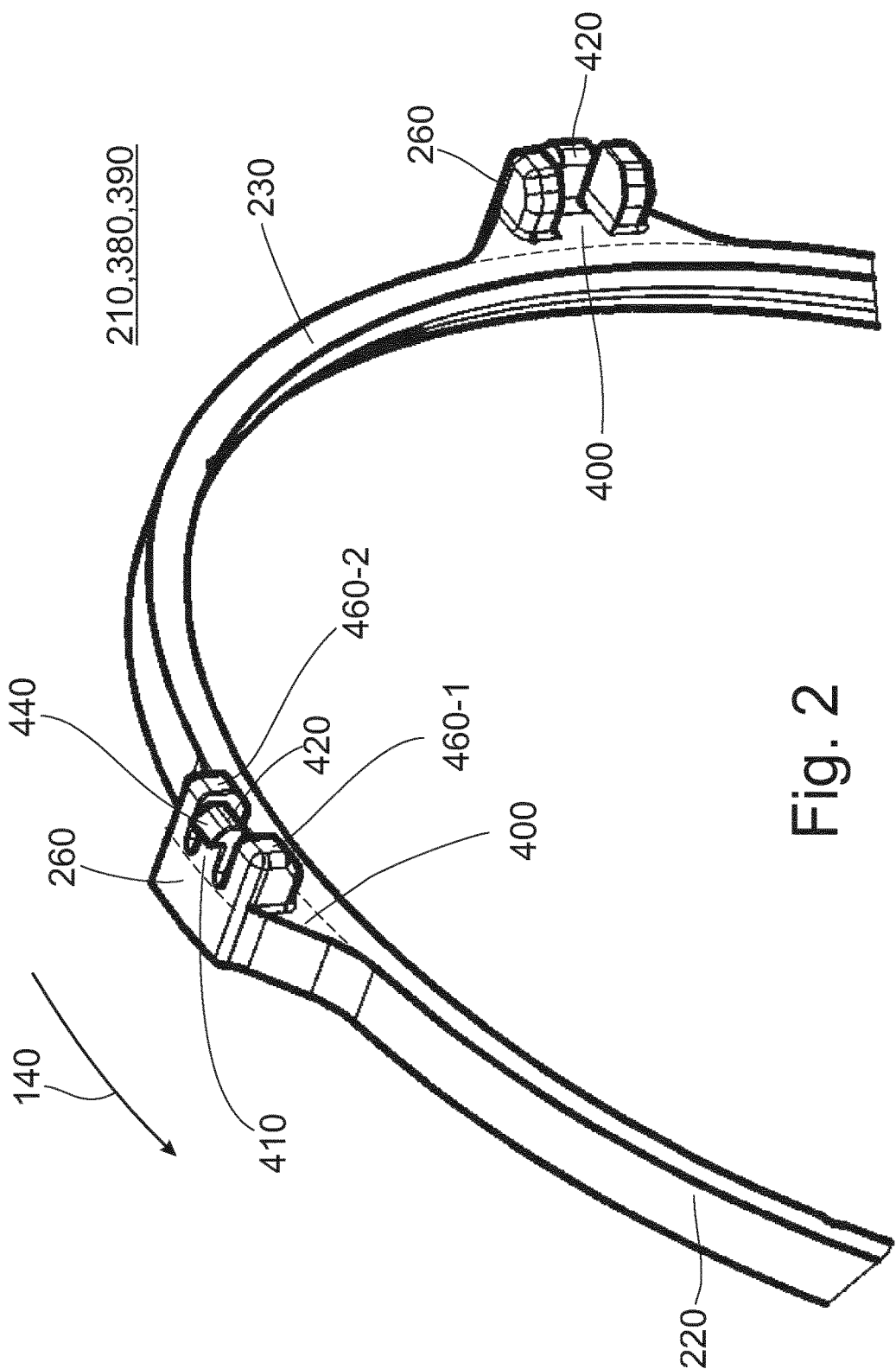
FIG. 2 is a perspective view of a supporting ring as an example of a supporting body or a supporting structure.

FIGS. 2 to 7 show different views of a supporting body 210 that, is constructed as a supporting ring 380 and can also serve, for example, as supporting structure 390. FIG. 2 shows a perspective view showing two catch structures 260 that are arranged at an offset of 90° relative to one another, for example. As will be explained, the catch function is configured such that the catch noses face radially outward, i.e., upward.

Figure 3:
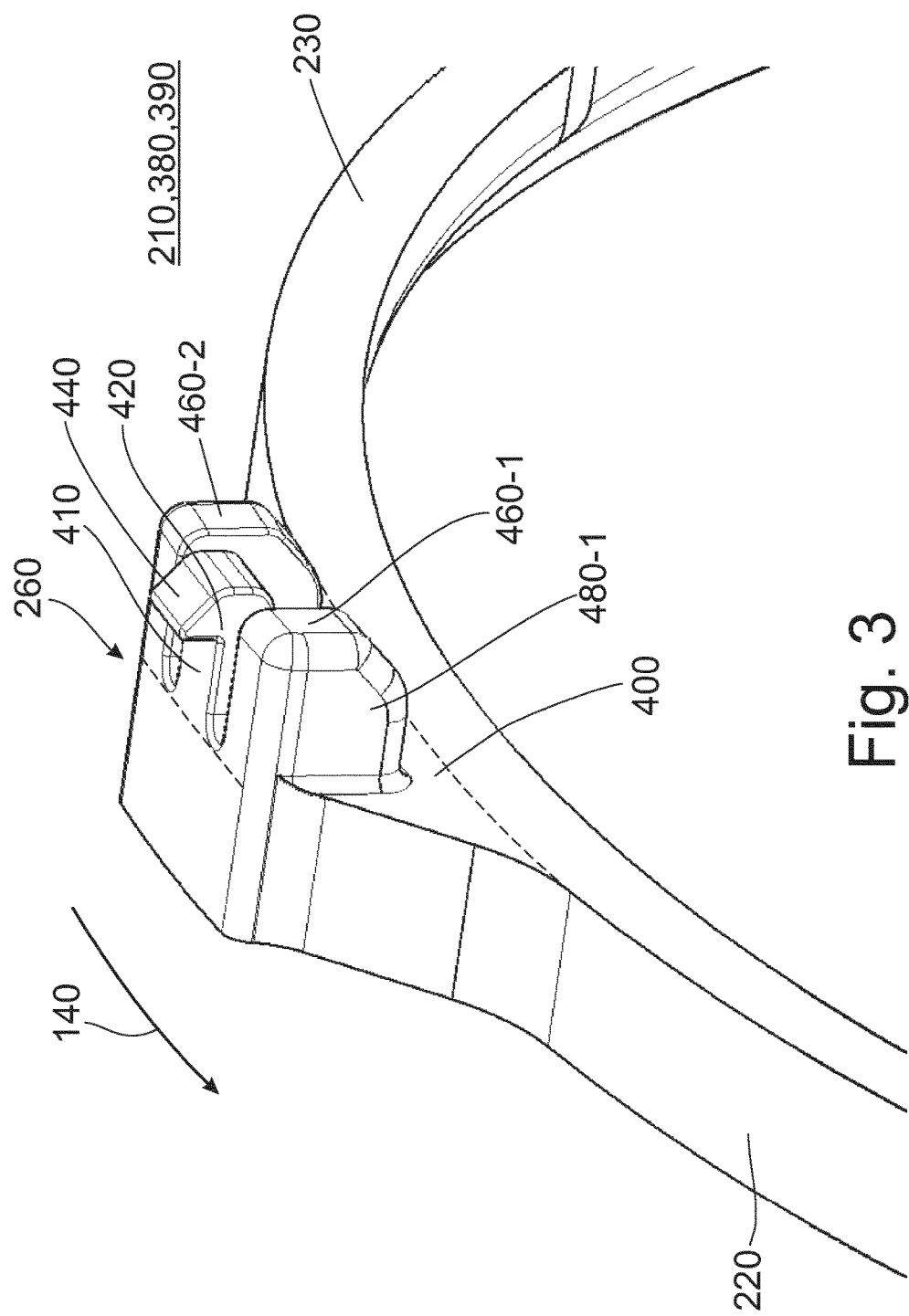
FIG. 3 is an enlarged perspective view of a catch structure of the supporting ring from FIG. 2.
Figure 4:
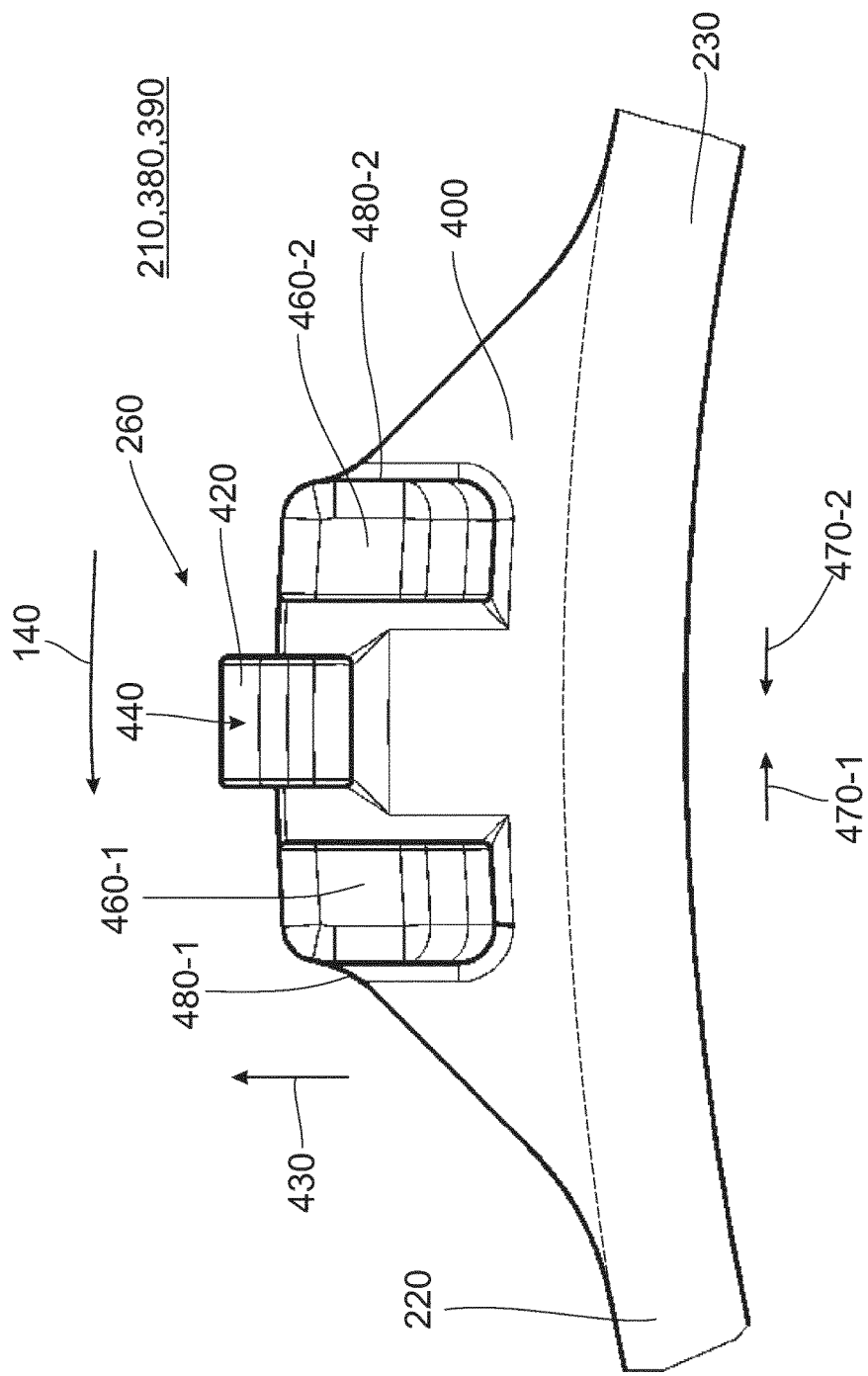
FIG. 4 is a front view of the catch structure of the supporting ring from FIGS. 2 and 3.
Figure 5:
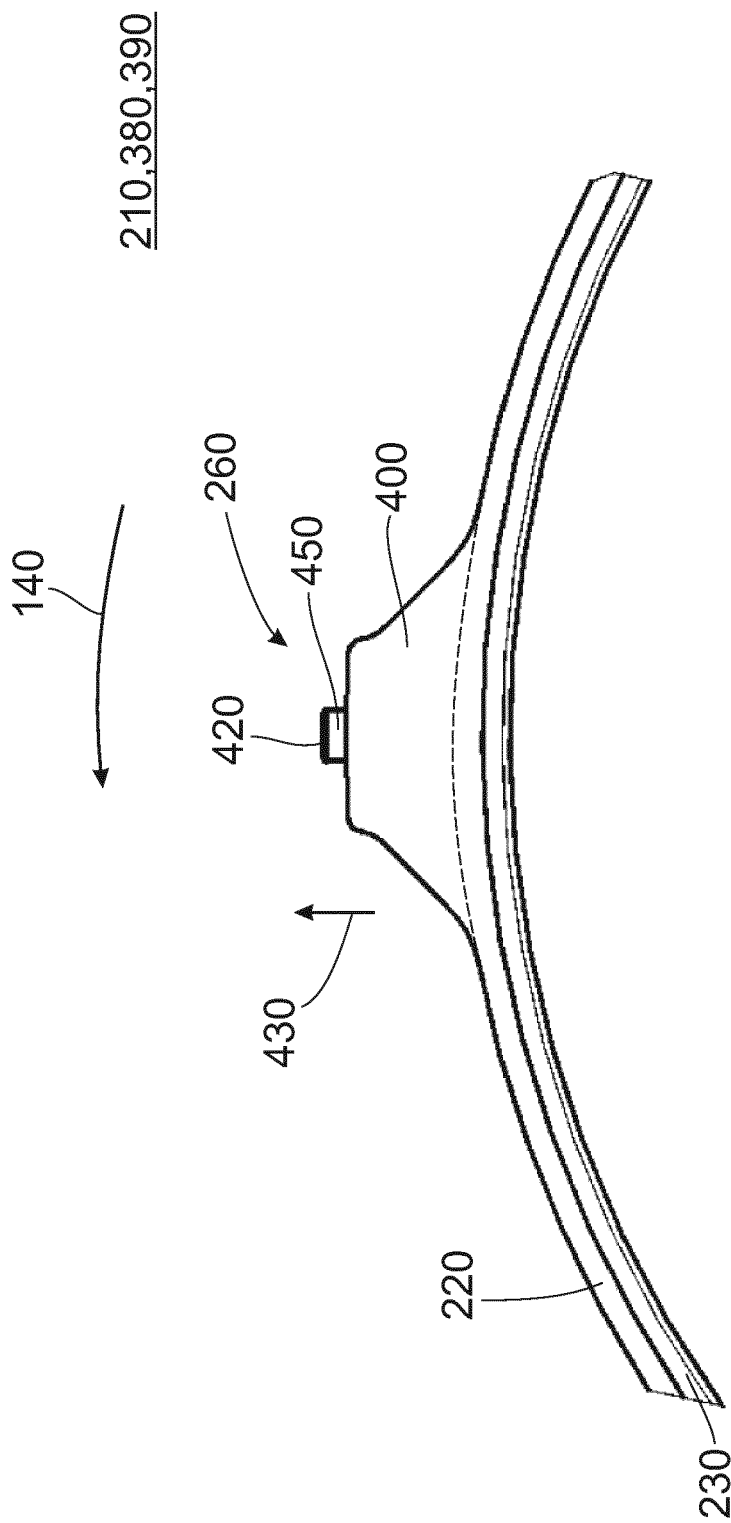
FIG. 5 is a rear view of the catch structure of the supporting ring from FIGS. 2 to 4.
Figure 6:
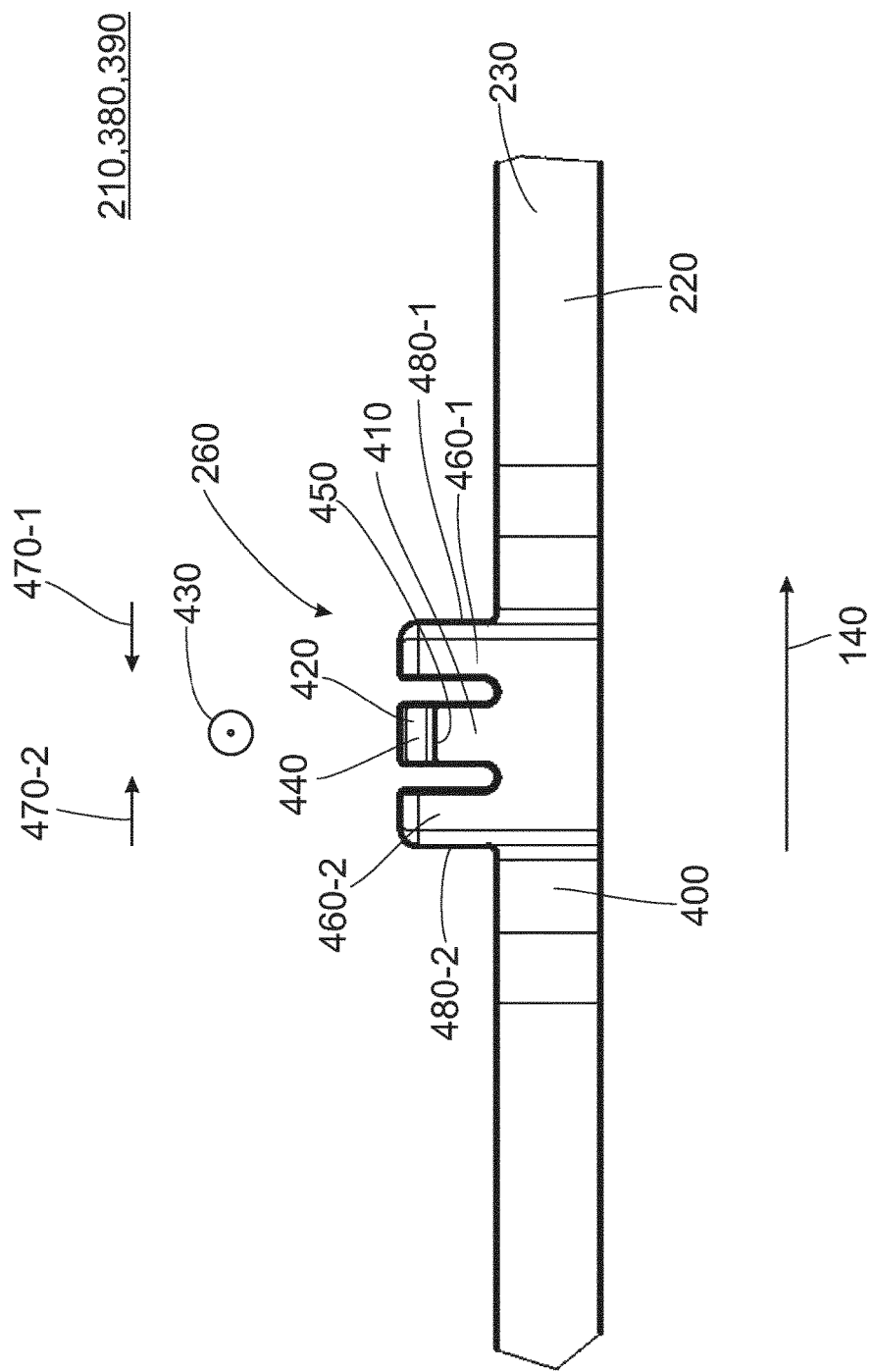
FIG. 6 is a top view of the catch structure of the supporting ring from FIGS. 2 to 5.
Figure 7:
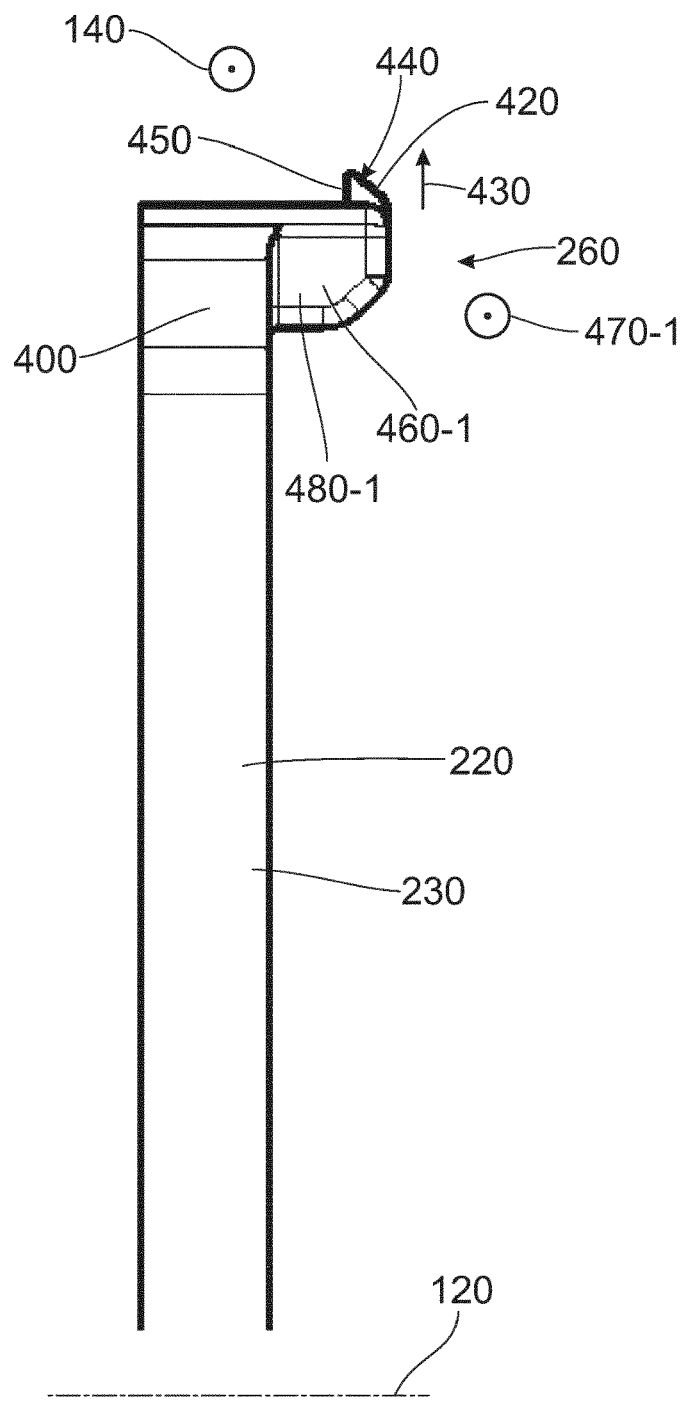
FIG. 7 is a side view of the catch structure of the supporting ring from FIGS. 2 to 6.

FIG. 3 shows a corresponding enlarged view of the catch structure 260, likewise as perspective view, while FIG. 4 is a front view of a catch structure 260, i.e., shows the view of the corresponding catch nose from the front. Correspondingly, FIG. 5 shows a rear view of the catch structure 260, while FIG. 6 shows a view from the top or from radially outside, i.e., a top view of the catch structure 260. Finally, FIG. 7 shows another side view of the catch structure 260 in which the catch nose again faces radially outward ("upward").

The supporting body 210 has retaining portion 230 that, because it is configured as supporting ring 380, extends annularly and substantially completely around the axial direction 120, not shown in FIGS. 2 to 7. More precisely, the supporting ring 380 in this case even extends completely around the axial direction, which is not necessarily necessary in other examples even when implementing as a supporting ring 380. Depending on the specific configuration, an extension of, for example, at least 270°, at least 300° or at least 350° can already be sufficient.

Since the supporting body 210 shown here is configured radially inwardly with respect to the retaining portion 230 referring to the damper masses 130 (not shown in FIGS. 2 to 7), the latter has the retaining surface 220, with which the damper mass 130 enters into contact or is in contact as the case may be, at a radially outer side.

The supporting body 210 further has a fastening portion 400 which is directly connected to the retaining portion 230. The fastening portion 400 extends radially outward past the retaining portion 230 and retaining surface 220 thereof. In the example shown here, this is arranged precisely so that the corresponding catch structure 260 is arranged between two damper masses 130 arranged adjacently along the circumferential direction 140. As has already been mentioned, the catch structures 260 are arranged at a 90-degree angle in this instance so that the corresponding damper masses 130 are also arranged at a 90-degree angle relative to one another. More exactly, in the example shown here, the catch structures 260 comprise exactly one fastening structure 400 for every catch structure 260. In other examples, however, partitioned fastening structures 400 can also be used so that more than one fastening structure 400 per catch structure 260 can also possibly be used.

The catch structures 260 further comprise a reach-through portion 410 directly connected to the fastening portion 410 and, beyond this, is constructed to extend through the catch aperture 270. Adjoining the reach-through portion is a catch nose 420 connected to the reach-through portion 410 and is configured to engage behind the damper mass carrier 150 with the damper mass carrier 150 along a back engagement direction 430. In the example shown here, the back engagement direction 430 is directed radially outward because the catch nose 420 also projects past the reach-through portion 410 via the reach-through portion 410 in this direction. The catch structure 260 can be elastically deformable to make it possible to engage behind the damper mass carrier 150. To this end, the reach-through portion 410, for example, can be constructed to be elastically deformable along the back engagement direction 430. Depending on the material used, this can be carried out, for example, in that the reach-through portion 410 has a smaller thickness so that the reach-through portion 410 allows precisely the corresponding elastic deformability during the forces usually occurring along the back engagement direction 430 given a corresponding assembly. In this case, it may be advisable to select the thickness of the reach-through portion so as not to be too small to prevent an unintended undoing of the positive engagement connection during operation of the tuned mass damper 110 or torsional vibration damper 100.

To facilitate assembly, for example, the catch nose 420 can have a bevel, for example, which facilitates insertion of the catch nose or of the entire catch structure 260 into the catch aperture 270 of the damper mass carrier 150. In this respect, a surface normal of the bevel 440 can have, for example, an angle of at least 10°, at least 20°, at least 30° or at least 45° relative to the axial direction 120. However, it can also be advisable to set an upper limit for the angle in question, for example, in order to limit the catch structure 260 with respect to its extension in axial direction 120. For example, the angle in question can be at most 80°, at most 70° or at most 60°.

The catch nose 420, which is otherwise also referred to as retainer nose, has an abutting surface or contact face 450, which can be at most 20° or at most 10° at a side remote of the bevel 440. In this respect, after assembly, the contact face 450 possibly directly contacts the damper mass carrier 150 and, together with the material of the catch nose 420, ultimately brings about the axial securing of the supporting ring 380 or supporting body 210 or supporting structure 390. In other words, the forces and moments needed for the axial securing are introduced in the supporting body 210 via the contact face 450 during the operation of the tuned mass damper 110 or torsional vibration damper 100.

The catch structure 260 further has two guide portions 460-1, 460-2 along the circumferential direction 140 which are configured to drive and/or guide the supporting body 210 along a guide direction 470-1, 470-2 perpendicular to the back engagement direction 430. The two guide portions 460 are arranged in such a way that the reach-through portion 410 and the catch nose 420 are arranged along the circumferential direction between the guide portions 460. Of course, instead of two guide portions 460-1, 460-2, only one individual guide portion 460 can be used when it is necessary or sufficient to drive or guide along only one guide direction, for example, owing to the overall configuration of the tuned mass damper 110 or torsional vibration damper 100.

More than the two shown guide portions 460 can also possibly be implemented if this seems expedient or advisable.

The guide portion or guide portions can be configured in precisely such a way that they drive or guide the supporting body with the guide direction. To this end, the guide direction 470 can be directed, for example, into the interior of the material of the guide portion. If in doing so a force is exerted on a guide surface 480-1, 480-2, the guide direction 470 can be perpendicular to the guide surface 480, for example, but can be directed into the material of the guide portion 460.

The guide portion or guide portions 460 can have a thickness along the back engagement direction 430, for example, such that the guide portion or guide portions 460 are substantially dimensionally stable vis-à-vis deformations along the back engagement direction 430.

In order to simplify production of the supporting body as much as possible and, at the same time, configure the latching qualities of the supporting body with respect to the damper masses 130 and not least of all also with respect to comfort and operating reliability, the supporting body 210 can be produced, for example, from a plastic, for example, a thermoplastic, i.e., particularly also an injection-moldable material. Polyamide is a material of this type and can be reinforced through the use of fibers, for example. The fibers can be glass fibers, carbon fibers or graphite fibers, for example. Accordingly, the supporting body 210 can be produced, for example, from glass fiber-reinforced polyamide 4.6 to mention only one example. In this respect, the supporting body can be constructed in one piece or integrally, for example, and can be produced, for example, over the course of a single injection molding process.

Figure 8:
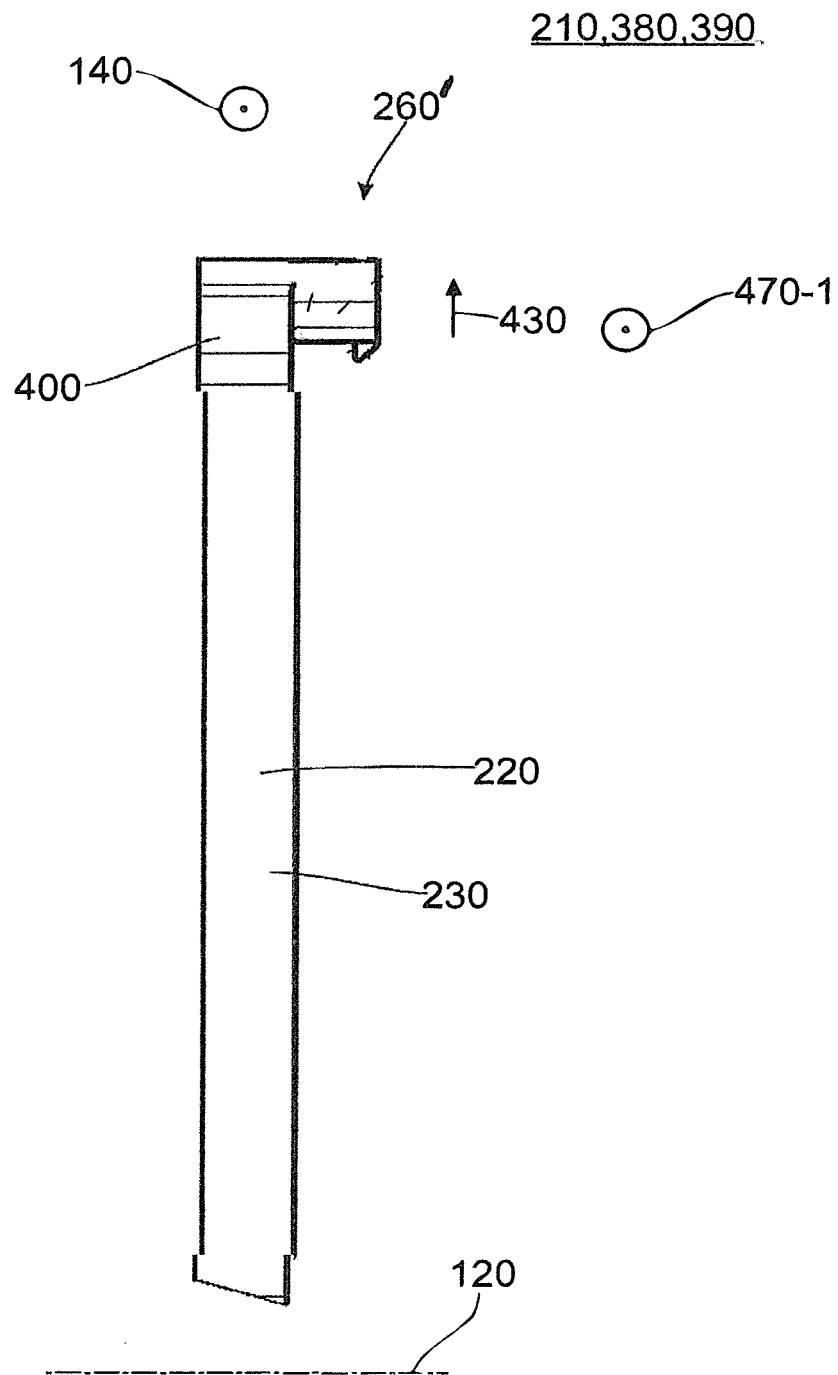
FIG. 8 is a view comparable to FIG. 7 of a further supporting ring with a diverging catch structure.
Figure 9:
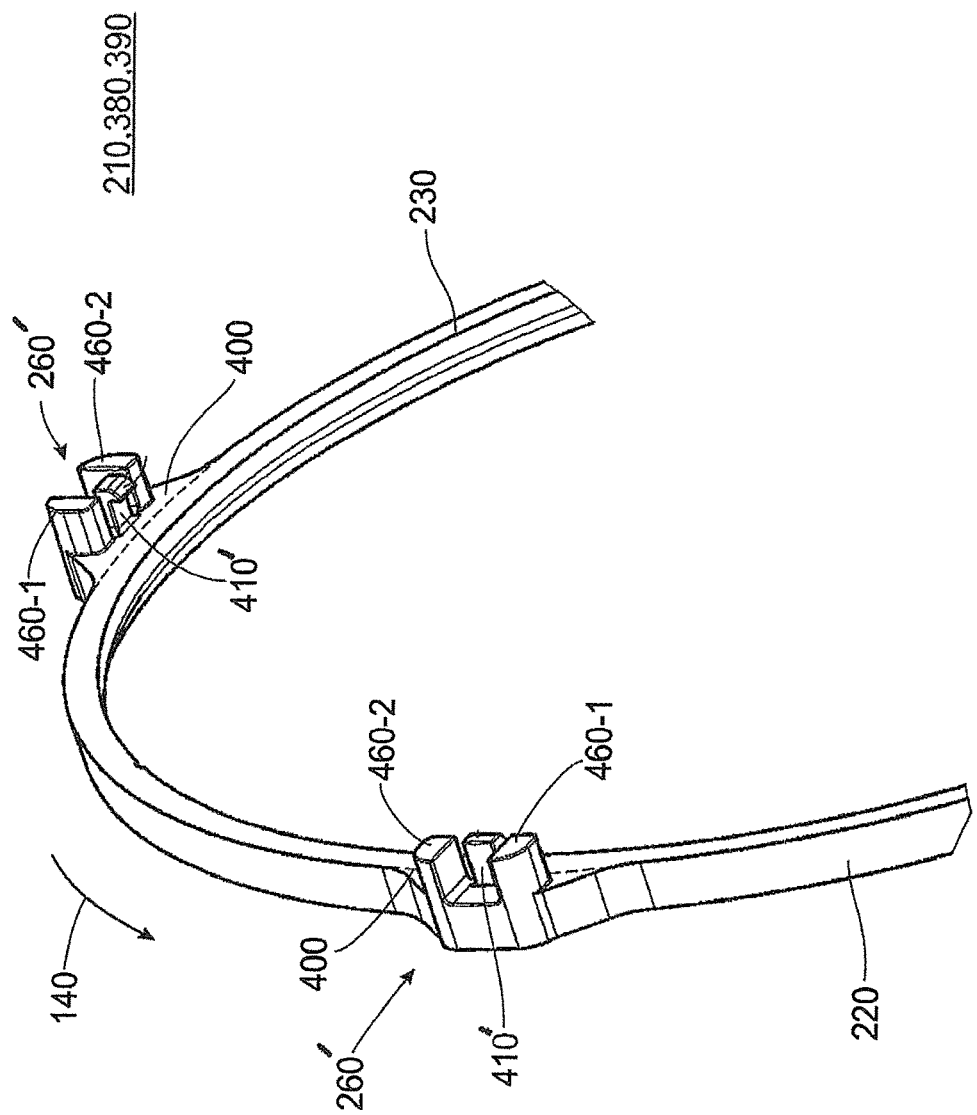
FIG. 9 is a perspective view comparable to FIG. 2 of a supporting ring with the catch structure shown in FIG. 8.
Figure 10:
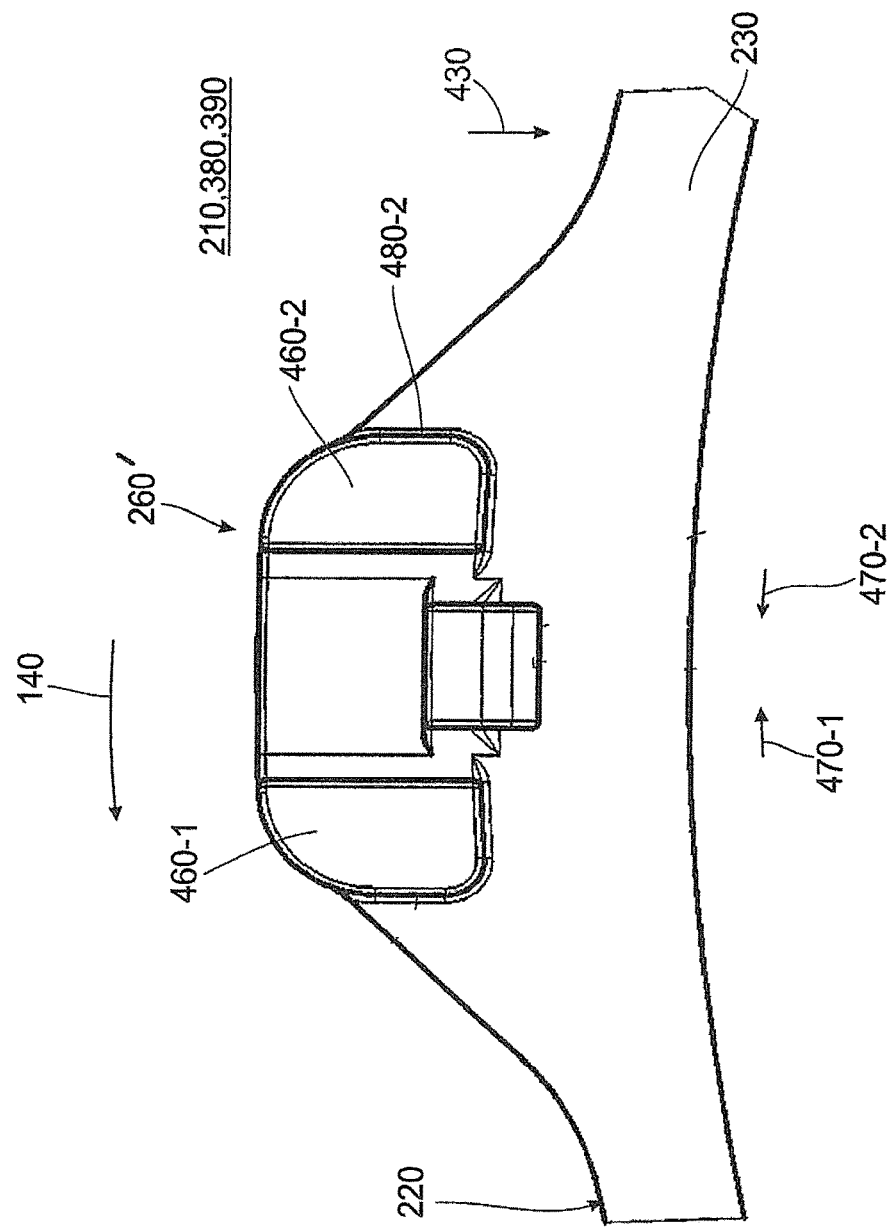
FIG. 10 is a front view comparable to FIG. 4 of the catch structure from FIGS. 8 and 9.

FIGS. 8, 9 and 10 show a further possible construction of a supporting body 210 in the form of a supporting ring 380. FIG. 8 shows a side view, FIG. 9 shows a perspective view with two catch structures 260' offset by approximately 90°, and FIG. 10 shows a front view of the catch structure 260'. This differs from the construction of the supporting body 210 shown in FIGS. 2 to 7 substantially in that the back engagement direction 430 faces radially inward and the catch nose 420 correspondingly protrudes over the reach-through portion 410' radially inward or downward. Correspondingly, the reach-through portion 410' is arranged radially inwardly at the fastening portion 400, whereas this was not the case in the supporting body 210 shown previously. In the latter case, the reach-through portion 410' was arranged radially outwardly at the fastening portion 400.

Beyond this, the catch structure 260' differs from the embodiment of the supporting body 210 shown in FIGS. 7 to 10 with respect to a transition radius between the guide surfaces 480 of the guide portions 460 and the portions oriented correspondingly perpendicular to the axial direction. These are appreciably smaller in the construction shown in FIGS. 8 to 10 than in the preceding description. Accordingly, material can be spared, but a greater radius of curvature in this region possibly facilitates the insertion of the catch structure 2601.

Figure 11:
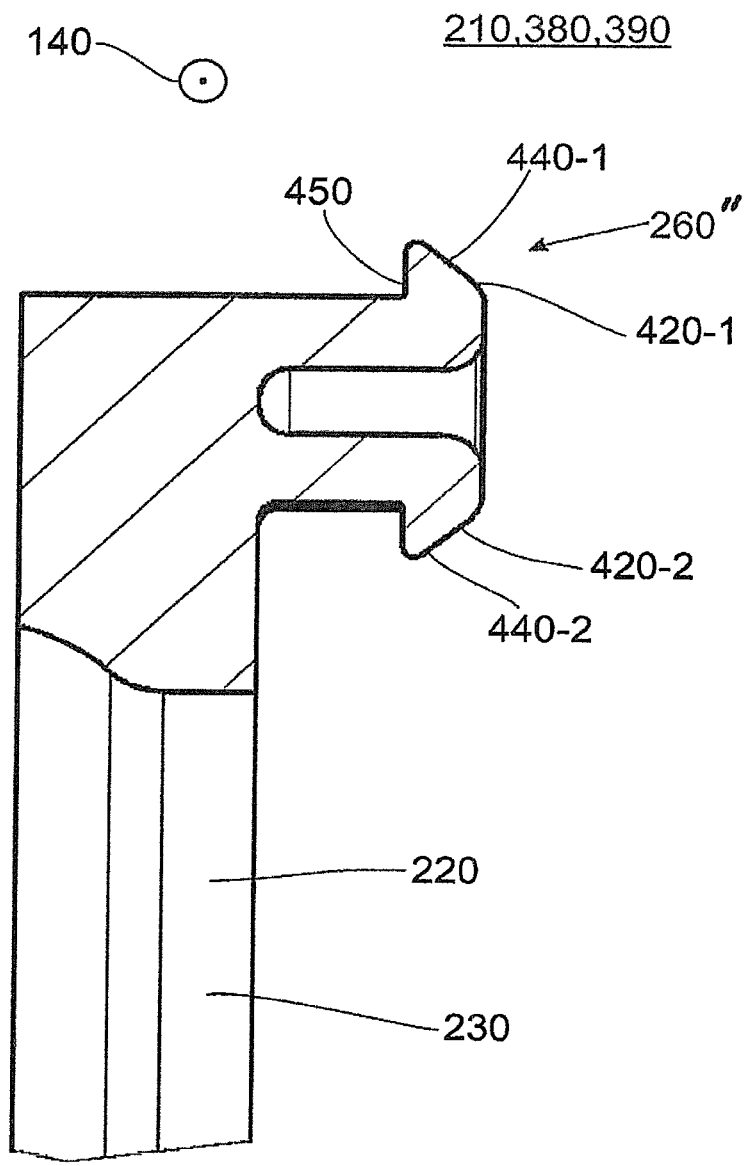
FIG. 11 is a cross-sectional view through a further catch structure of a supporting ring.
Figure 12:
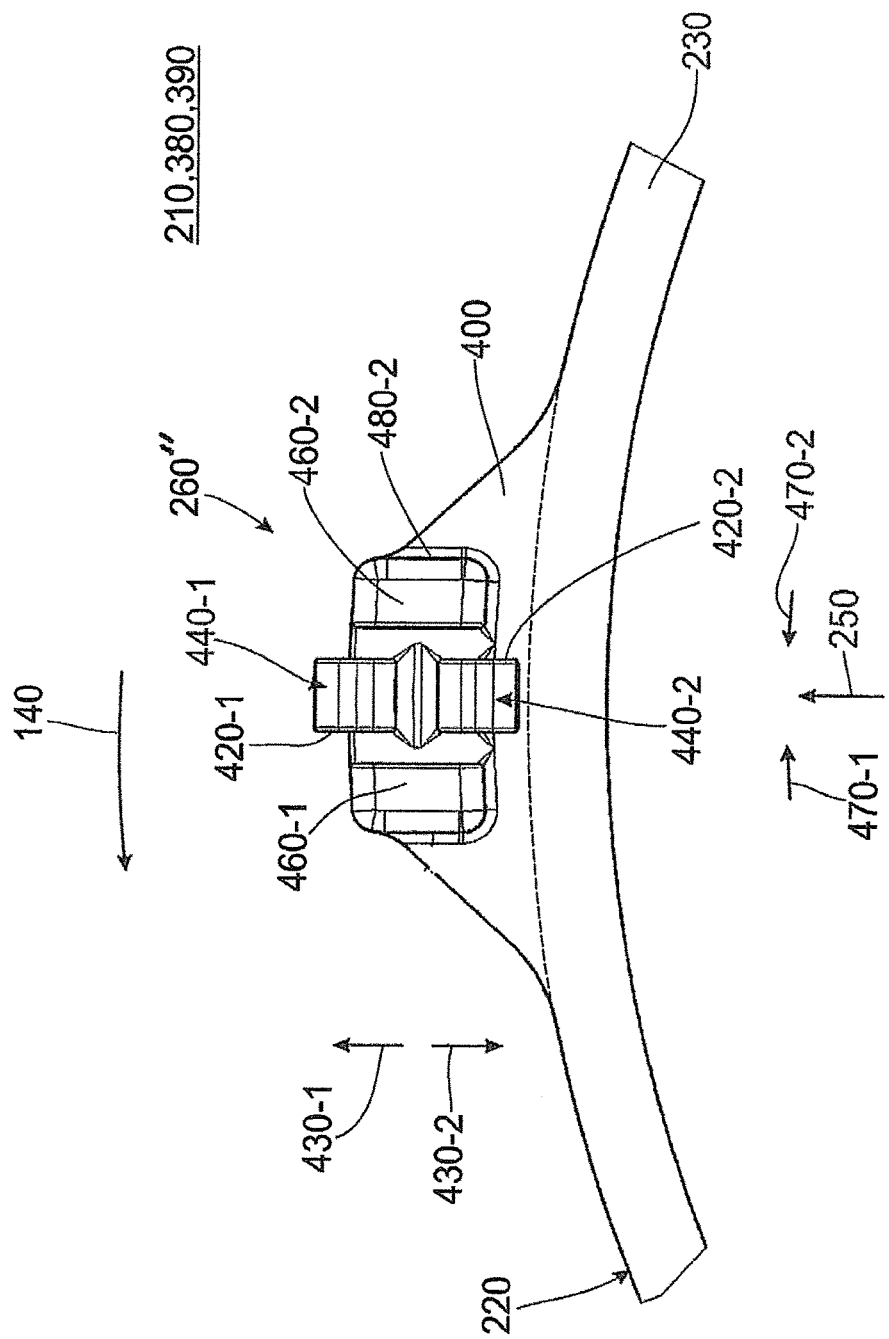
FIG. 12 is a front view comparable to FIGS. 4 and 10 of the catch structure shown in FIG. 11.
Figure 13:
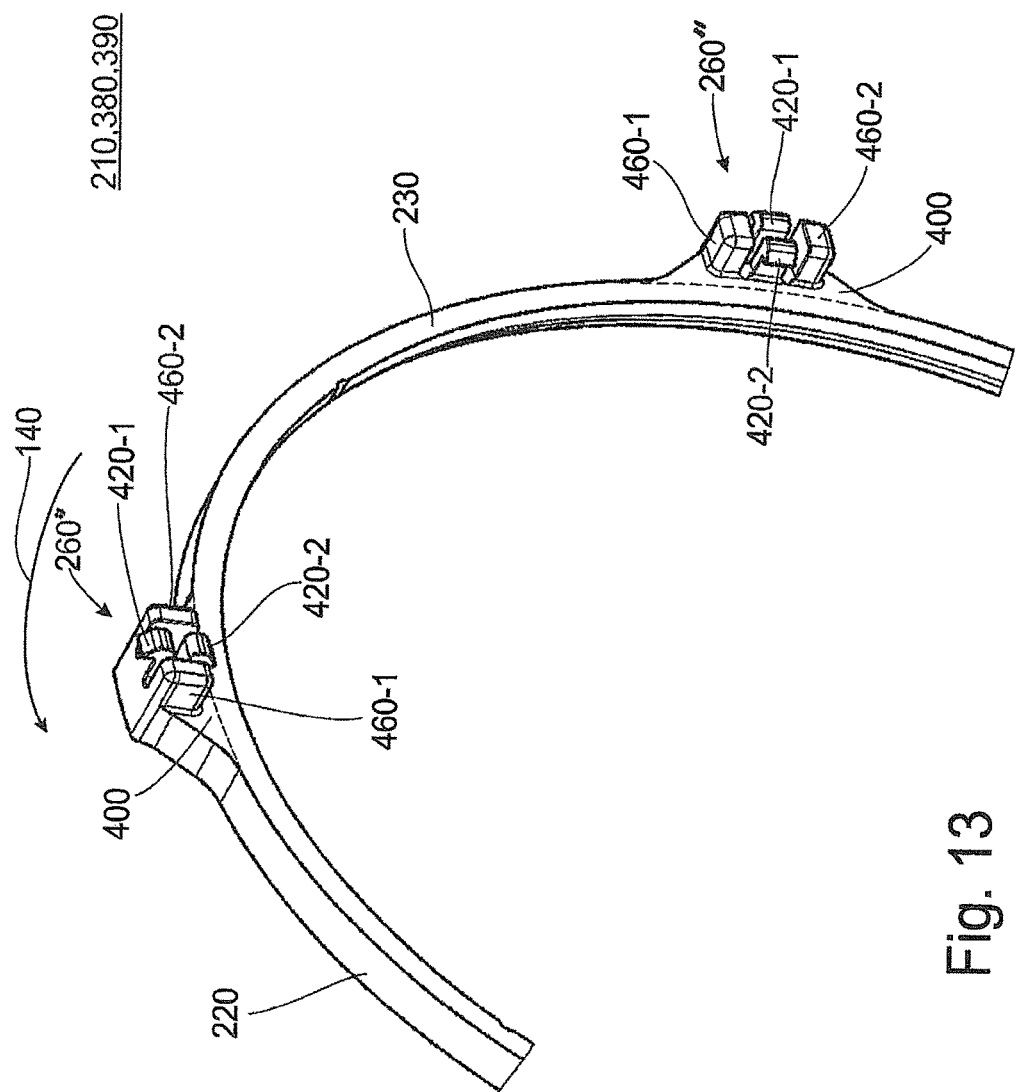
FIG. 13 is a perspective view comparable to FIGS. 2 and 9 of the supporting ring with the catch structures from FIGS. 11 and 12.

FIGS. 11, 12 and 13 show a further configuration of a supporting body 210. More precisely, FIG. 11 shows a partial cross-sectional view through the catch structure 260", while FIG. 12 shows a front view of the catch structure 260 and FIG. 13 shows a perspective view. The supporting ring 210 again has four catch structures 260" arranged so as to be offset by 90° relative to one another but, in contrast to the supporting bodies 210 described above comprise two reach-through portions 410 per catch structure 260". In other words, the catch structures in this case have in each instance a plurality of reach-through portions 410-1, 410-2 which are formed to extend through one or more catch apertures 270 (not shown in FIGS. 11 to 13). Correspondingly, the catch structures 260 also have in each instance a plurality of catch noses 420, one of which, respectively, is directly connected to one of the reach-through portions 410 and is configured to engage behind the damper mass carrier 150. In the example shown here, exactly one catch nose is connected to a reach-through portion 410.

For a somewhat more exact comprehension, the supporting body 210 shown in FIGS. 11 to 13 has, to be precise, exactly one retaining portion 230 and at least one, more exactly even a plurality of, fastening portions 400. The retaining portion is directly connected to the fastening portion and fastening portions 230 in each instance. As has already been explained, the retaining portion 230 is in this case also there again in order to be in contact with or enter into contact with the damper mass or damper masses 130 when the tuned mass damper 110 is stopped and/or in another operating situation. The reach-through portion 410 of the plurality of reach-through portions is directly connected to precisely one fastening portion 400. The catch noses 420 connected to the reach-through portions 410 are configured to engage behind the damper mass carrier along at least two back engagement directions 430-1, 430-2 which are noncollinear and/or opposite one another. More specifically, in the embodiment example shown here, the two back engagement directions 430-1, 430-2 are opposed to one another and, owing to the protruding of the two catch noses 420 along the radial direction 250, the two back engagement directions 420 also extend along this radial direction 250.

In this case also, the reach-through portions 410 are again constructed to be thinner to allow a corresponding elasticity of the catch structure 260". The thickness is configured precisely in such a way that the two catch noses 420 can still be moved toward one another so that they can be guided through the corresponding catch aperture 270.

In a corresponding manner, the catch noses 420 also have a bevel 440-1, 440-2 in each instance. Otherwise, the construction shown in FIGS. 11 to 13 resembles that shown in FIGS. 2 to 7 with respect to the configuration of the guide portions 460. It again has the larger radius between the guide surface 480 and the corresponding surface extending perpendicular to the axial direction. For the rest, the same radius relative to a corresponding surface of the guide portions 460 that is oriented perpendicular to the radial direction 250 was implemented in all of the supporting bodies 210 described in the preceding. But, of course, different radii can also be used.

Accordingly, the supporting body 210 in FIGS. 11 to 13 exhibits a catch function of the corresponding catch noses 420 which is directed radially upward and downward or radially outward and inward.

FIGS. 14, 15, 16 and 17 show different views, cross sections through an assembly 490 of a torsion damper 100 with a corresponding tuned mass damper 110 in which the supporting body 210 shown in FIGS. 2 to 7 is used.

Figure 16:
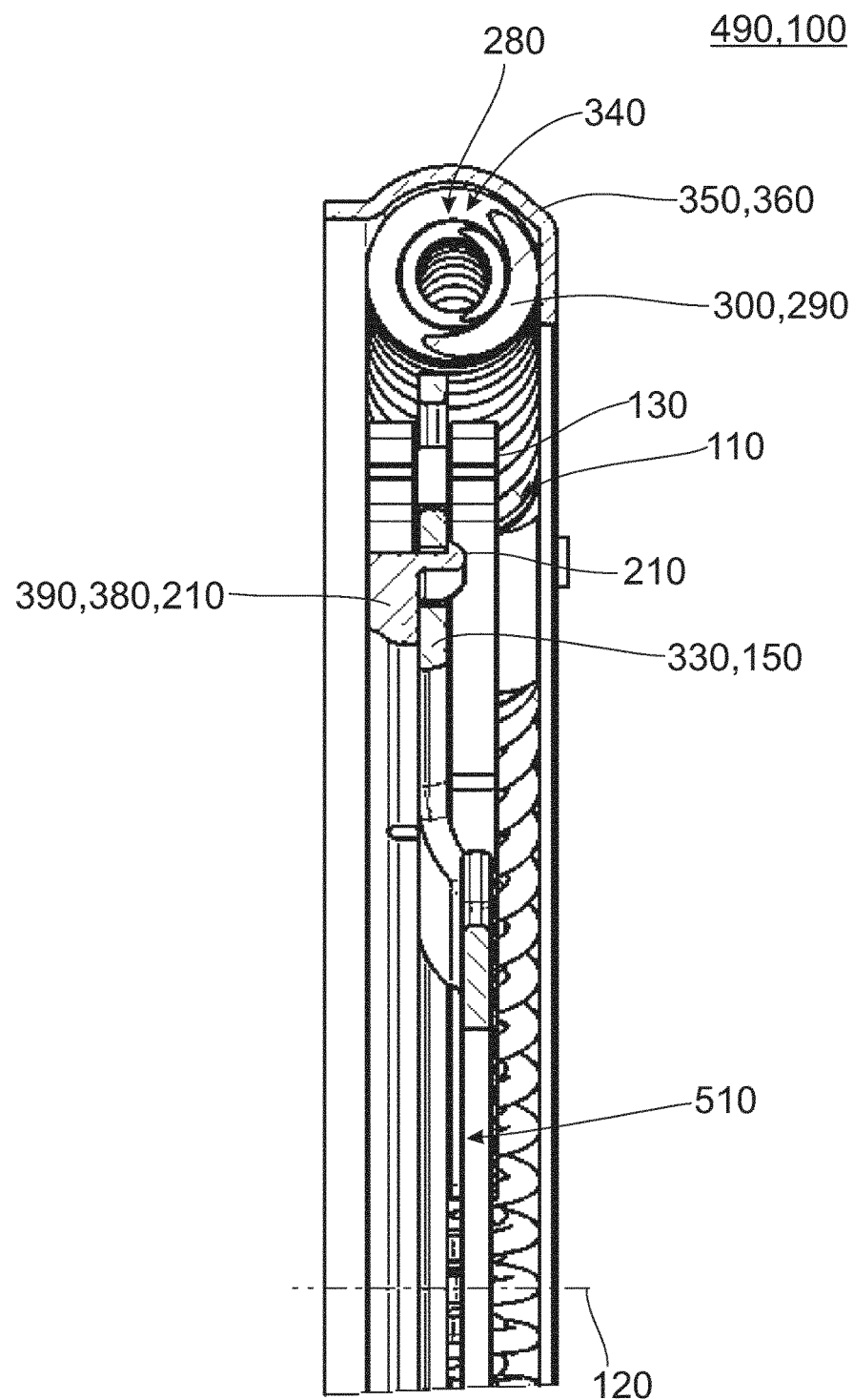
FIG. 16 is a cross-sectional view through the subassembly shown in FIGS. 14 and 15.
Figure 17:
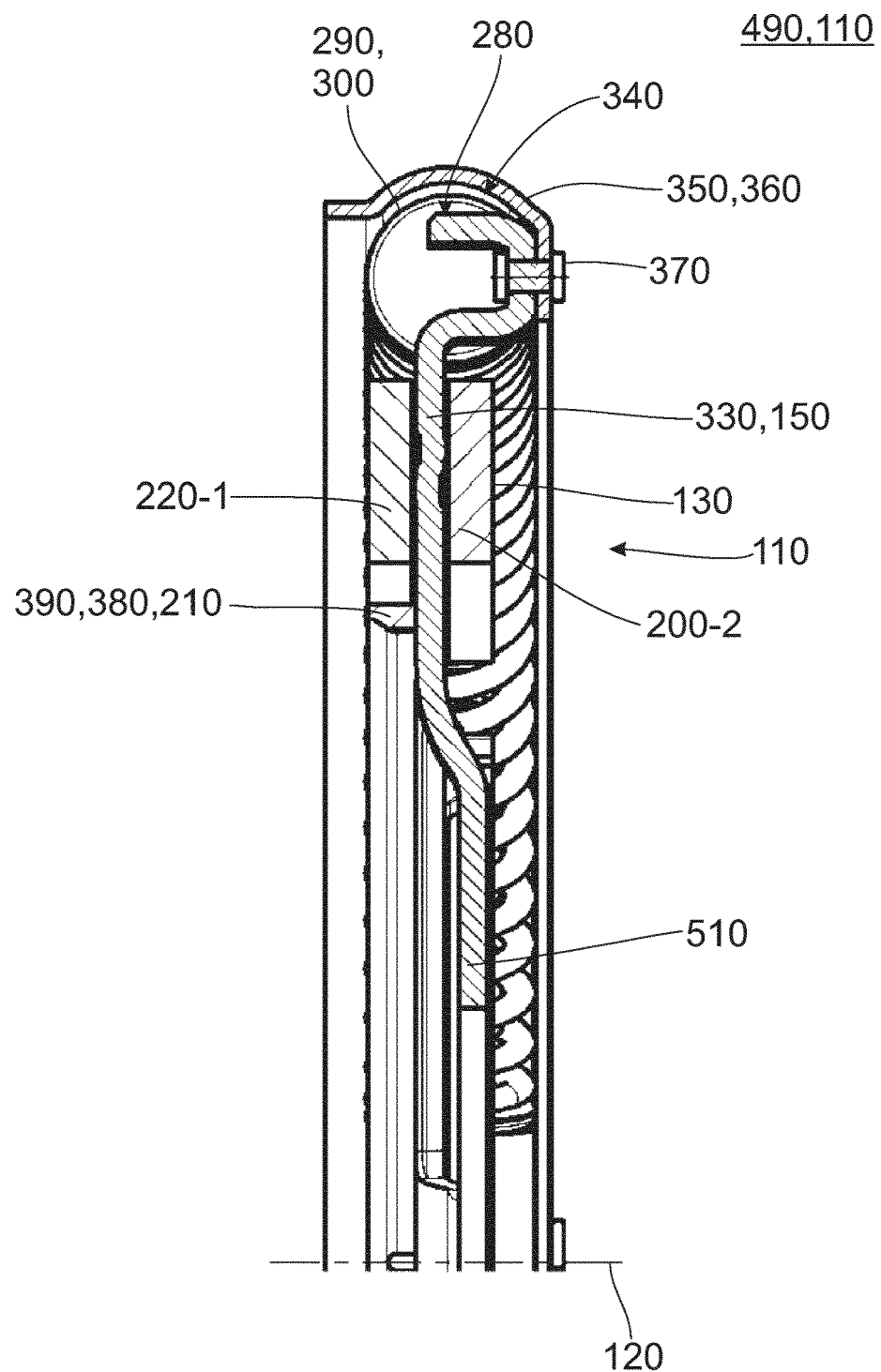
FIG. 17 is a cross-sectional view along a divergent section plane of the subassembly from FIGS. 14 to 16.

FIG. 14 shows the assembly 490 from the first side, while FIG. 15 shows a corresponding perspective view of the assembly 490 from the second side with respect to the damper mass carrier 150. The damper mass carrier is again constructed as a hub disk 330 as has already been illustrated in connection with FIG. 1. FIGS. 16 and 17 show corresponding cross-sectional views through the assembly 490. The section planes also differ slightly from one another in this instance.

In this case also, the assembly 490 again has a first rotational vibration damper 280 located radially outside. The first rotational vibration damper 280 has four energy storage elements 300, each of which comprises at least one spring 290 arranged in a corresponding channel 340. The channel is formed in turn by a corresponding cover component part 350 in the form of a cover plate 360 which at least partially covers the energy storage elements 300 arranged so as to be evenly distributed along the circumferential direction 140. As has already been described in connection with FIG. 1, the cover component part 350 is again also connected to the hub disk 330 forming the damper mass carrier 150 by means of rivet connections. For example, FIGS. 14, 15 and 17 each show at least one corresponding rivet 370. More precisely, even FIGS. 14 and 15 show four regularly arranged rivets 370 for providing the corresponding mechanical connection between the cover component part 350 and the hub disk 330. Otherwise, the structural component parts in question are connected to one another so as to be fixed with respect to relative rotation by the rivet connections.

For the sake of simplicity, the preceding description is referred to with respect to the configuration of the supporting body 210 in the form of a supporting ring 380.

In addition to the damper mass carrier 150, the tuned mass damper 110 again comprises at least one damper mass 130. More precisely, four damper masses 130 are also implemented here corresponding to the symmetry of the rivets 370 and the catch structures 260. In their ideal position, as in FIGS. 14 and 15 during operation without the influence of rotational irregularities, the damper masses 130 are arranged so as to be offset by 90° in each instance.

In this case also, the damper masses 130 again have in each instance at least one partial damper mass 200-1 and a partial damper mass 200-2 which are connected to one another at opposite sides of the damper mass carrier 150 via corresponding connection pins 500. In this case, to be precise, each of the damper masses has a corresponding mechanical connection in the form of a connection pin 500 in the respective end region along the circumferential direction.

As has already been described in connection with FIG. 1, the damper masses further have rolling elements 170 which also contribute not least to the guiding of the damper masses 130 at the damper mass carrier 150. The rolling elements shown here can again be configured as stepped rolling elements as has already been shown in FIG. 1.

Radially inwardly of the supporting ring 380 or supporting body 210, the hub disk 330 or damper mass carrier 150 has four webs 419 which are likewise arranged at an offset of 90° relative to one another. These webs define windows 520 in the energy storage elements 300, for example, in the form of springs 290, for the second rotational vibration damper 310, not shown in FIGS. 14 to 17. Here also, the hub disk 330 or damper mass carrier 150 can accordingly serve as control component part for the relevant energy storage elements 300 (not shown) of the second rotational vibration damper 310.

In this case also, the hub disk 330 again has in the radially inner region a bearing area 320 via which the hub disk 330 can be guided correspondingly radially at another structural component part. FIGS. 14 to 17 show the assembly 490 in which the catch structures 260 of the supporting body 210 are moved into their end position. In this case, FIG. 16, for example, shows the nose 210 engaging behind the damper mass carrier 150 in the radially outer region of the supporting body 210.

The catch structures 260 engage in the corresponding catch apertures 270, which can be configured in this case, for example, as holes in the hub disk 330 or damper mass carrier 150. Accordingly, it may be advisable to provide the catch apertures 270 at the corresponding positions. As will be shown in the following, it can possibly be advisable to adapt a radial gap between the supporting body 210 and another, corresponding structural component part to the thermal expansion coefficients of the utilized materials within the framework of the attainable tolerances and accuracies. Depending on the specific configuration, the expansion coefficients of plastics and metals or metal alloys diverge from one another very markedly. Plastics often have appreciably higher linear expansion coefficients which can transmit, for example, at least 1.5 times, at least 3 times, but often greater than 5 times, greater than 7 times or even greater than 10 times more.

Figure 18:
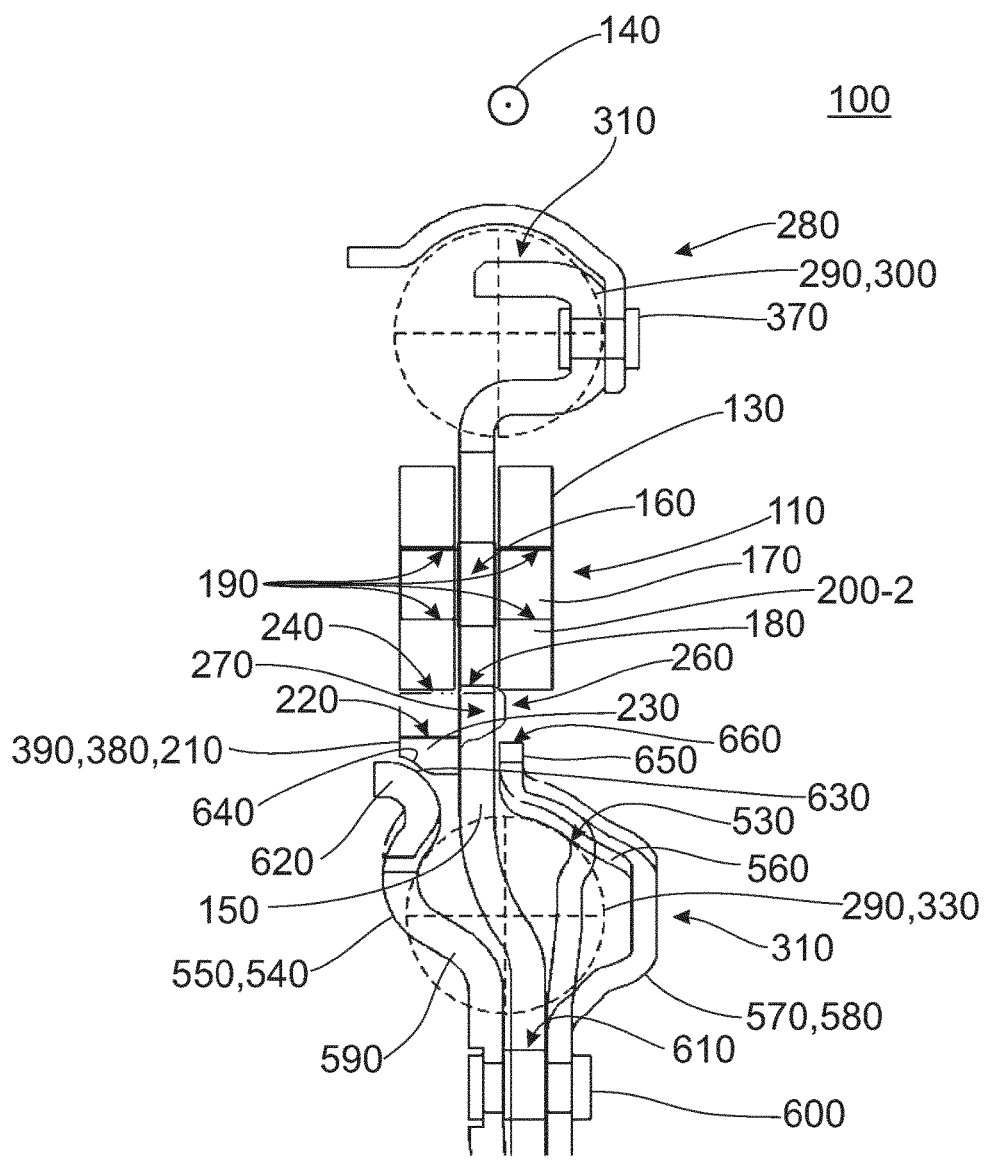
FIG. 18 is a schematic cross-sectional view through a torsional vibration damper with two rotational vibration dampers and a tuned mass damper.

As regards the configuration of the catch apertures 270, a radial guiding or a driving of the supporting body 210 may be given prominence depending on the specific configuration of play in relation to the circumferential direction 140 or the radial direction 250. FIG. 18 shows a schematic cross section through a torsional vibration damper 100 with a tuned mass damper 110. The torsional vibration damper 100 shown in FIG. 18 bears strong similarities to the torsional vibration damper 100, which has already been shown in and described with reference to FIG. 1. This description is therefore referred to in this connection.

But while the bearing portion 320 was shown in FIG. 1 and the second rotational vibration damper 310 was shown merely by a possible position of its energy storage elements 300 or its springs 290, the second rotational vibration damper 310 is shown much more completely in the torsional vibration damper 100 shown here. Accordingly, the second rotational vibration damper 310 arranged radially inside of the damper masses 130 or tuned mass damper 110 again has a plurality of energy storage elements 300, which can be formed, for example, as springs 290, and can be arranged so as to be correspondingly distributed along the circumferential direction 140. The energy storage elements can again be arranged in a channel 530 formed at least partially by a cover component part 540, for example, a cover plate 550. Further, the channel 530 can be formed by a cover portion 560 of a control component part 570, for example, a control plate 580. Accordingly, together, the control component part 570 and the cover component part 540 can at least partially enclose the energy storage elements 300 such that the energy storage elements are likewise arranged in the channel 530 as has already been described for the energy storage elements 300 and the channel 340 of the first rotational vibration damper 280.

The cover component part 540 further has in the torsional vibration damper 100 shown here a control portion 590 which can likewise indirectly or directly contact the control component part 570 with the energy storage elements 300. Together, the control portion 590 of the cover component part 540 and the control component part 570 form an output-side control of the energy storage elements 300. For this reason, the cover component part 540 and the control component part 570 are connected to one another so as to be fixed with respect to relative rotation by rivet connections, i.e., by rivets 600. The rivets 600 extend through a corresponding elongated hole 610 in the hub disk 330 in order to allow a rotation of the hub disk 330 with respect to the cover component part 540 and control component part 570.

In this regard, rivets 600 are arranged so as to be countersunk in the cover component part 540, for example, to economize on axial installation space in this region.

After it has been coupled into the energy storage elements 300 of the first rotational vibration damper 280, the rotational movement is transmitted via the hub disk 330, i.e., the damper mass carrier 150, to energy storage elements 300 of the second rotational vibration damper 310, from which the rotational movement is supplied on the output side via the two structural component parts, namely, cover component part 540 and control component part 570 and the corresponding rivet connection. Accordingly, this torsional vibration damper 100 has a total of three stages with two cascaded rotational vibration dampers between which the tuned mass damper 110 is connected.

The torsional vibration damper 100 shown here further has a support structure 620 in the region of the second rotational vibration damper 310, which support structure 620, together with the supporting body 210, is able to radially support the supporting body under a first operating condition. This operating condition may be independent, for example, from the speed of the torsional vibration damper 100. Under a second operating condition, which may also be independent from the speed, for example, but which differs from the first operating condition, the support structure 620 can release the supporting body 210 again radially. To this end, the support structure 620 has a gap when the second operating conditions prevail. Depending on the constructional configuration, this gap can be, for example, between 0.5 mm and 1 mm, but can also take on higher values in different implementations Under the first operating condition, the temperature may fall below a predetermined first temperature, for example, while under the second operating condition a predetermined second temperature may be exceeded, for example. The second temperature may be greater than or equal to the first temperature.

In other words, at low temperatures the supporting body 210 can lie radially against the support structure 620, for example, and can be reinforced in such a way that, for example, forces that would otherwise have to be contained via the catch structures 260 during impact of the damper masses 130 at low temperatures can be conveyed at least partially via the support structures 620. This can be relevant, for example, when the supporting body 210 is made from a material that has an appreciably higher thermal expansion coefficient than the other material from which the support structure 620 is made, for example. This may be the case, for example, when the supporting body 210 is made of a plastic, while the support structure 620 is made of a metal or a metal alloy.

In a case like this, it may be advantageous to support the supporting body 210 on the support structure 620 under the first operating condition, i.e., for example, at low temperatures, and accordingly to prevent a mechanical overloading of the supporting body 210. Such a mechanical overloading can come about precisely in a supporting body 210 made from plastic at low temperatures because of an embrittlement of the plastic material.

As a result of the radial support which is accordingly initiated, a radial guiding which supplements the radial guiding through the catch structures 260 can be implemented in case of a supporting body 210 such as that described above. Depending on the specific configuration of catch structure 260 and catch aperture 270, the radial guiding can be consistently maintained regardless of the first operating condition or second operating condition.

To reduce point loads or the occurrence of tilting moments, for example, it may be advisable to adapt a geometry or contour of the support structure 620 to the corresponding shape of the supporting body 210. To be more exact, the support structure 620 in this case has a support surface 630, while the supporting body 210 has a corresponding counter-support surface 640. Accordingly during the first operating condition, the support surface 630 abuts the counter-support surface 640 of the supporting body 210 or enters into contact with it in order to support the supporting body 210.

The damper mass carrier 150 is configured to guide the supporting body 210 radially in the same direction as the support structure 620 supports the supporting body 210. The damper mass 130 comprises a first partial damper mass 200-1 and a second partial damper mass 200-2, wherein the first partial damper mass 200-1 is arranged along the axial direction 120 at a first side of the damper mass carrier 150, and the second partial damper mass 200-2 is arranged at a second side remote of the first side along the axial direction 120, wherein the first and second partial damper masses 200 are mechanically connected to one another, and wherein the torsional vibration damper 100 is configured such that only the first partial damper mass 200-1 can enter into contact with or be in contact with a supporting body 210 during the at least one operating situation.

In order to reduce or completely eliminate the above-mentioned point loads or the occurrence of excessive tilting moments, the support surface 630 and the counter-support surface 640 can have, at least partially or even in their entirety, a contour in a cross-sectional plane along the axial direction 120 and radial direction 250, these contours being adapted to one another. The two contours can have, for example, comparable radii of curvature in case of circular contours in the cross-sectional plane in question. In this case, it may be advisable to take into account the relevant expansion coefficients and the prevailing temperature conditions when adapting the geometries, although this is, of course, not necessary. Of course, other geometric shapes can also be used at this location instead of a circular configuration. Accordingly, it may be possible that the two surfaces 630, 640 allow a line-shaped contact in order to prevent point loading of the possibly brittle supporting body 210 and/or to reduce the occurrence of tilting moments.

Although the support structure 620 in this case is naturally configured precisely so as to support the supporting body 210 on the radially inner side so that, i.e., the support surface 630 faces radially outward at least partially, an appropriate different configuration can, of course, be carried out in other embodiment forms.

For the rest, the support structure 620 is formed integral with an output component part of the torsional vibration damper in this instance. But, of course, it can also be implemented at a corresponding input component part or an intermediate component part or as a separate structural component part in other examples.

In other words, an inner contour of the supporting ring 380 can be adapted to the left-hand cover plate 550, for example. The cover component part 540 is the cover plate 550, and the support structure 620 is formed by a reshaped portion of the cover plate 550. If an excessive contraction of the support ring 380 comes about at low temperatures owing to thermal expansion, the inner diameter of the supporting ring 380 also changes in particular. The supporting ring 380 can then rest on the cover plate due to the adapted geometry without undergoing high contact forces. Beyond this, owing to the above-mentioned thermal expansion, an inclination to tilt on the part of the supporting ring 380 can also be reduced, since it is supported by its inner contour at the outer contour, namely, the support surface 630 of the cover plate.

However, in the torsional vibration damper 100 shown here as well as in that described above, the supporting body 210 serves as supporting structure acting to retain or contact the damper masses 130 during stoppage, close to stoppage, i.e., under a determined speed, or also in one or more operating situations. However, in order to prevent overloading of the supporting structure 390 precisely at low temperatures even under different corresponding operating conditions, a further supporting structure 650 can be provided that contacts the damper mass 130 under an operating condition which is independent from the speed, for example, and in an operating situation such as stoppage of the torsional vibration damper 100. During a divergent operating condition, the supporting structure 390, i.e., for example, the supporting body 210, can enter into contact with or be in contact with the damper masses.

As has already been explained, the two operating conditions in this case can include, for example, falling below a predetermined first temperature and exceeding a predetermined second temperature. Again, the second temperature can be greater than or at least equal to the first temperature. The two temperatures frequently diverge from one another precisely with respect to this aspect.

For example, the supporting structure 390 can be dimensioned and configured in such a way that the supporting structure 390 is at a distance from the damper mass 130 under the first operating condition and in a corresponding operating situation such as stoppage of the torsional vibration damper 100. Correspondingly, the further supporting structure 650 can also be dimensioned and configured in such a way that the further supporting structure 650 is at a distance from the damper mass 130 under the second operating condition and during a corresponding operating situation of the torsional vibration damper 100.

When the two above-mentioned temperatures diverge, three operating conditions result, for example; namely, one operating condition at particularly low temperatures, one at medium temperatures and one at high temperatures. At very low temperatures, the damper mass 130 can lie completely on the further supporting structure 650 without being in contact or entering into contact at all with the supporting body 210 or supporting structure 390. At medium temperatures, the additional support by the supporting body 210 or supporting structure 390 can then take place before the supporting body 210 or supporting structure 390 exclusively takes over the retention at high temperatures. Depending on the specific embodiment, room temperature, for example, may fall within the range of low, medium or even high temperatures.

This may be reinforced, for example, in that the corresponding torsional vibration damper 100 is a wet torsional vibration damper which is immersed in oil during operation, for example. Owing to the low temperatures, the viscosity of the oil increases so that a certain damping effect is brought about by the oil itself such that impact speeds of the damper mass on the further supporting structure 650 are reduced, which can also have a noise-reducing effect. At higher temperatures when the viscosity of the oil decreases, the supporting body 210 or supporting structure 390 can damp a corresponding impact in a noise-reducing manner owing to its configuration with respect to its material or other parameters.

The further supporting structure 650 can be constructed in principle as a separate component part or, as is shown in FIG. 18, can also be formed integral with another structural component part. In this case, the further supporting structure 650 is part of the control component part 570 and can be constructed, for example, as unshaped portion of the control plate 580. Under normal operating conditions, there can be a distance along the radial direction 250 between the corresponding further supporting structure 660 with which the damper mass 130 possibly enters into contact or is in contact and the retaining surface 220, for example, in the range between 0.5 and 1 mm, but can also take on larger or smaller values depending on tolerance and precision of production.

In this case, the fact that the diameter of the supporting ring 380 also changes during thermal expansion can be made use of. By means of a skillful adaptation of the right-hand cover plate, i.e., the control plate 580, it can take over the function of the supporting ring 380 for low temperatures so that the supporting ring 380, which is made from plastic, for example, can be protected at low temperatures owing to the embrittlement of the plastic which occurs at these low temperatures. As soon as the temperature exceeds a determined value, the supporting ring 380 can take on a size through thermal expansion such that the further supporting structure 650 of the right-hand cover plate (control plate 580) gives up the additional support and the supporting ring 380 again completely takes over this support.

Accordingly, in addition to rotational driving in the damper mass carrier 150, the supporting ring 380 can have stop contours at predetermined positions for the radial support of the supporting ring, for example, on input parts or output parts of the torsional vibration damper. In the present case, this is a cover plate, although the damper mass carrier 150 itself can also perform this function. In this case, the supporting ring 380 can contact this additional stop contour only under predetermined operating conditions, i.e., for example, at low temperatures leading to a contraction of the ring.

Beyond this or alternatively, the tuned mass damper, which is also referred to as a speed-adaptive damper (DAT), can have at least two stop devices. The first stop device can be operative under a first predetermined operating condition, for example, at a low temperature of the right-hand cover plate, while the second stop device is operative under a second predetermined operating condition, i.e., for example, at higher temperatures, when the supporting ring 380 again completely takes over its function.

Figure 19:
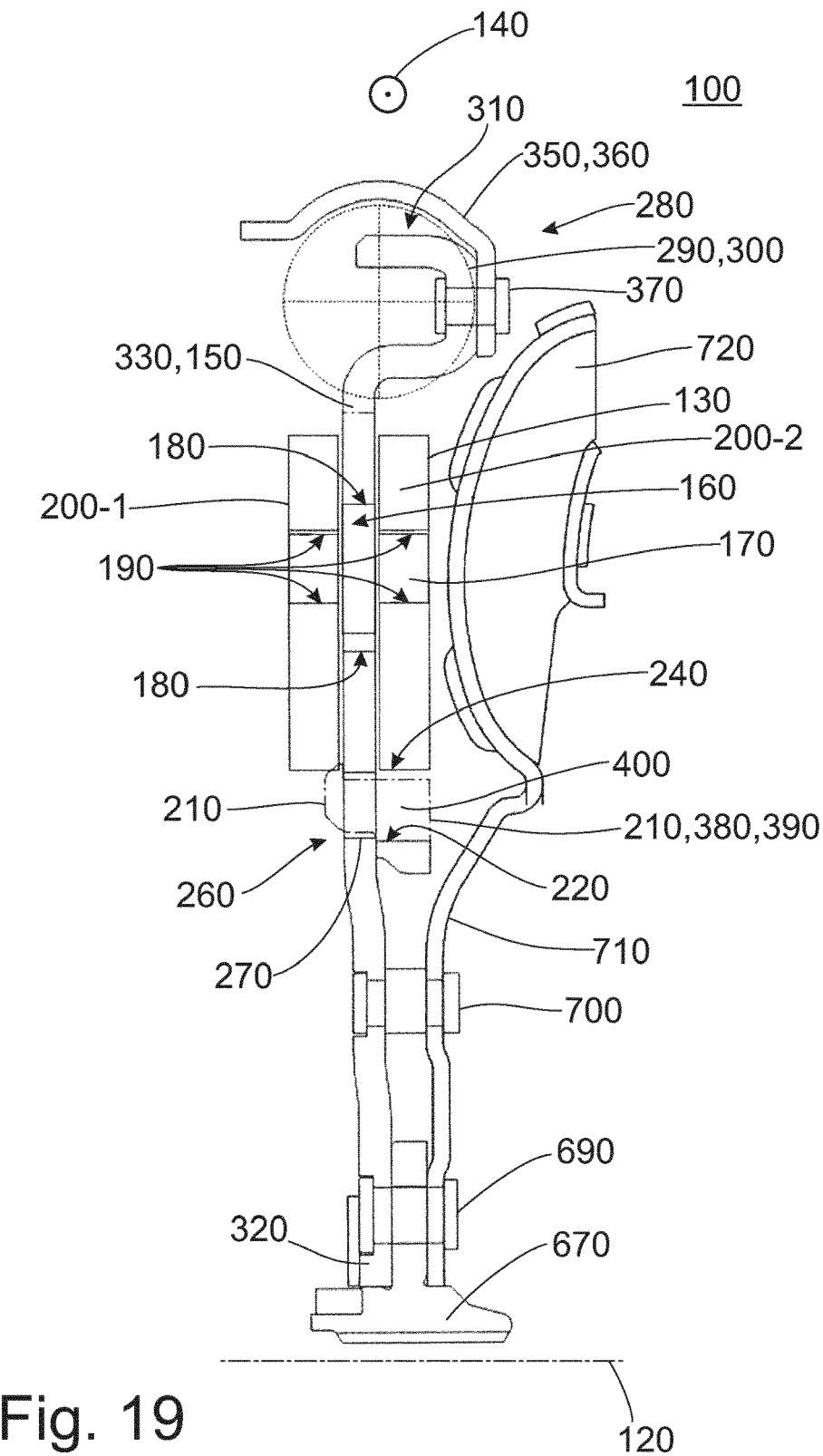
FIG. 19 is a schematic cross-sectional view through a further torsional vibration damper with a rotational vibration damper and a tuned mass damper which is coupled to a torque converter.

Finally, FIG. 19 shows an embodiment of a torsional vibration damper 100, which resembles the embodiment shown in FIGS. 1 and 18. However, the torsional vibration damper shown in FIG. 19 differs with respect to some constructional details from that described in the preceding. For example, the supporting body 210 is now no longer arranged on the side which typically faces the drive motor, but rather on the side facing the transmission. Nevertheless, the supporting body 210 is again also fastened by its catch structure 260 in the corresponding catch aperture 270 by positive engagement.

The hub disk 330 which again serves in this case to control the rotational vibration damper 280 and as damper mass carrier 150 again has a bearing portion 320 which rests on an output hub 670 and is connected to the latter so as to be fixed with respect to rotation relative to it via a corresponding flange 680 and a corresponding rivet connection via a plurality of rivets 690.

However, the implementation shown in this instance has no second rotational vibration damper 310 such as was described above. Instead, the hub disk 330 is mechanically coupled via the rivets 690 and via further rivets 700 to a turbine 710 of a torque converter which, however, is shown only in a fragmentary view in FIG. 19. FIG. 19 shows a turbine blade 720, which is mechanically connected to the turbine 710.

The features disclosed in the preceding description, the subsequent claims and the accompanying figures may be of importance and be implemented, both individually and in any combination, for the realization of an embodiment example in their various implementations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper configured to damp a vibration component of a rotational movement around an axial direction, comprising:
    a damper mass configured to carry out an oscillation depending on the rotational movement to damp the vibration component of the rotational movement;
    a damper mass carrier configured to movably guide the damper mass;
    a supporting body connected to the damper mass carrier to drive the supporting body relative to the damper mass carrier during rotation of the torsional vibration damper and configured to be one of in contact with or to enter into contact with the damper mass in at least one operating state of the torsional vibration damper;
    a support structure configured to radially support the supporting body under a first operating condition, wherein the first operating condition includes dropping below a predetermined first temperature, and a radial gap between the support structure and the supporting body under a second operating condition that differs from the first operating condition;
    a rotational vibration damper having a plurality of energy storage elements arranged along a circumferential direction, via which energy storage elements the rotational movement is transmitted in order to damp one of the vibration component and a further vibration component of the rotational movement,
    wherein the plurality of energy storage elements are arranged in a channel that is at least partially covered by a cover component part,
    wherein the cover component part comprises the support structure,
    wherein the cover component part is a cover plate, and
    wherein the support structure is formed by a reshaped portion of the cover plate.

2. The torsional vibration damper according to claim 1, wherein the second operating condition includes exceeding a predetermined second temperature.

3. The torsional vibration damper according to claim 2, wherein the second temperature is greater than or equal to the first temperature.

4. The torsional vibration damper according to claim 1, wherein the supporting body is made of a material that has a higher thermal expansion coefficient than a material from which the support structure is made.

5. The torsional vibration damper according to claim 1, wherein the support structure is made from a metal or a metal alloy.

6. The torsional vibration damper according to claim 1, wherein an output component part of the torsional vibration damper comprises the support structure.

7. The torsional vibration damper according to claim 1, wherein the supporting body is connected to the damper mass carrier to be radially guided by the damper mass carrier during the first and second operating conditions.

8. The torsional vibration damper according to claim 7, wherein the damper mass carrier is configured to guide the supporting body radially in a same direction as the support structure supports the supporting body.

9. The torsional vibration damper according to claim 1, wherein the support structure has a support surface configured to one of contact or enter into contact with a complementary support surface of the supporting body to support the supporting body.

10. The torsional vibration damper according to claim 9, wherein the support surface and the complementary support surface have in each instance at least partially a contour in a cross-sectional plane along the axial direction and radial direction such that one contour is adapted to the other.

11. The torsional vibration damper according to claim 1,
wherein the damper mass comprises a first partial damper mass and a second partial damper mass,
wherein the first partial damper mass is arranged along the axial direction at a first side of the damper mass carrier, and the second partial damper mass is arranged at a second side remote of the first side along the axial direction,
wherein the first and second partial damper masses are mechanically connected to one another, and
wherein the torsional vibration damper is configured such that only the first partial damper mass can enter into contact with or be in contact with the supporting body during the at least one operating situation.

12. The torsional vibration damper according to claim 1, wherein the rotational vibration damper is arranged radially inside the damper mass.

\* \* \* \* \*